(12) United States Patent
Adachi et al.

(10) Patent No.: US 8,610,865 B2
(45) Date of Patent: Dec. 17, 2013

(54) LIQUID CRYSTAL DISPLAY DEVICE HAVING PARTICULAR REFLECTION MEANS

(75) Inventors: Masaya Adachi, Hitachi (JP); Osamu Itou, Hitachi (JP); Shigeki Nishizawa, Mobara (JP)

(73) Assignee: Japan Display Inc., Tokyo (JP)

( * ) Notice: Subject to any disclaimer, the term of this patent is extended or adjusted under 35 U.S.C. 154(b) by 175 days.

(21) Appl. No.: 13/334,320

(22) Filed: Dec. 22, 2011

(65) Prior Publication Data

US 2012/0176563 A1 Jul. 12, 2012

(30) Foreign Application Priority Data

Jan. 7, 2011 (JP) ................. 2011-001861

(51) Int. Cl.
*G02F 1/1343* (2006.01)
*G02F 1/1335* (2006.01)

(52) U.S. Cl.
USPC ........... 349/144; 349/146; 349/141; 349/113; 349/62

(58) Field of Classification Search
USPC .............................. 349/144, 146, 141, 113, 62
See application file for complete search history.

(56) References Cited

U.S. PATENT DOCUMENTS 7,289,182 B2 * 10/2007 Yanagawa et al. ............ 349/144

FOREIGN PATENT DOCUMENTS

| JP | 6-138453 | | 5/1994 | |
| JP | 06138453 A | * | 5/1994 | ............ G02F 1/1335 |
| JP | 2012145628 A | * | 8/2012 | ............ G02F 1/1335 |

* cited by examiner

*Primary Examiner* — Mike Qi
(74) *Attorney, Agent, or Firm* — Antonelli, Terry, Stout & Kraus, LLP.

(57) ABSTRACT

The TFT substrate includes a pixel electrode and a common electrode laminated one on top of another via an insulating layer, one of the pixel electrode and the common electrode provided farther from the liquid crystal layer being formed into a plane shape, and another of the pixel electrode and the common electrode provided closer to the liquid crystal layer having slits formed therein, each of the plurality of slits having a closed end portion. The liquid crystal display panel further includes a reflection portion for reflecting light, the reflection portion being formed at a surface of the liquid crystal display panel on the illumination device side in a portion which overlaps, in plan view, the end portion of the each of the slits in the long-side direction and a vicinity thereof, and a part of an inner region of the each of the slits.

14 Claims, 20 Drawing Sheets

LIQUID CRYSTAL DISPLAY DEVICE HAVING PARTICULAR REFLECTION MEANS

CROSS-REFERENCE TO RELATED APPLICATION

The present application claims priority from Japanese application JP 2011-001861 filed on Jan. 7, 2011, the content of which is hereby incorporated by reference into this application.

BACKGROUND OF THE INVENTION

1. Field of the Invention

The present invention relates to a liquid crystal display device.

2. Description of the Related Art

Conventionally, liquid crystal display devices to be used for a television set or the like include a liquid crystal display device in which an electric field is formed between a common electrode and a pixel electrode, and liquid crystal is driven with the electric field.

In such a liquid crystal display device, the pixel electrode and the common electrode are laminated one on top of another via an insulating layer. One of the electrodes is provided with slits, and the other of the electrodes is formed into a uniform plane shape without a space, that is, formed into a so-called solid shape.

As the electrode provided with the slits, there is a comb-shaped electrode in which one end of both end portions of each slit is closed and the other end thereof is opened, or an electrode in which both the end portions of the slits are closed. Further, multi-domain type liquid crystal display devices include a liquid crystal display device in which the slits of such electrodes are bent.

By the way, in the liquid crystal display devices, there are cases where, when the electric field is formed between the common electrode and the pixel electrode to drive the liquid crystal, a region in which a transmittance becomes low (hereinafter, referred to as domain) is generated because liquid crystal molecules are aligned in a direction different from a desired direction.

For example, in a case of a structure in which the electric field is generated by the above-mentioned electrode provided with the slits and a uniform plane-shaped electrode without a space, the domain is generated at end portions of the slits in a long-side direction thereof and in a vicinity thereof, or at bent portions of the slits and in a vicinity thereof. Such a liquid crystal display device has a problem in that the transmittance reduces due to the domain generated in an opening portion of a pixel, which causes reduction in brightness. To address this problem, it is conceived to increase the output of an illumination device (backlight unit) to increase the brightness, but this method has a problem in that power consumption increases.

Meanwhile, there has been proposed a liquid crystal display device in which light reflected on a rear surface of a liquid crystal display panel is reused, to thereby increase the brightness (for example, see Japanese Patent Application Laid-open No. Hei 06-138453). In the liquid crystal display device described in Japanese Patent Application Laid-open No. Hei 06-138453, a light reflection film is provided to a non-opening portion which does not influence the transmittance, such as a thin film transistor and a black matrix. Light is reflected by the light reflection film toward the illumination device (backlight unit), and the light is reflected toward the liquid crystal display panel again, to thereby reuse the light.

In the liquid crystal display device described in Japanese Patent Application Laid-open No. Hei 06-138453, in a case where the light reflection film to be provided to the non-opening portion is arranged on an inner side of a polarizing plate, when the light returning to the illumination device (backlight unit) is reflected by the illumination device (backlight unit) and returns to the liquid crystal display panel again, a polarization state of the light is changed, and hence most part of the light is absorbed in the polarizing plate, which reduces the brightness increase effect. Further, in a case where the light reflection film is arranged on an outer side of the polarizing plate, a positional relationship between the light reflection film and the non-opening portion deviates due to parallax, which reduces the brightness increase effect. Further, no consideration is given to the low-transmittance region in the opening portion, such as the domain.

SUMMARY OF THE INVENTION

The present invention has been made in view of the above, and has an object to provide a liquid crystal display device having lower power consumption at given brightness or higher brightness at given power consumption.

In order to solve the above-mentioned problem and achieve the above-mentioned object, the liquid crystal display device according to the present invention includes reflection means for reflecting light, the reflection means being formed at a region in a pixel opening portion, in which a transmittance becomes low because liquid crystal molecules are aligned in a direction different from a desired direction.

A liquid crystal display device according to the present invention includes: a liquid crystal display panel including: a thin film transistor (TFT) substrate including a TFT; a counter substrate arranged opposed to the TFT substrate; and a liquid crystal layer sandwiched between the TFT substrate and the counter substrate, the TFT substrate including a pixel electrode and a common electrode laminated one on top of another via an insulating layer, one of the pixel electrode and the common electrode provided farther from the liquid crystal layer being formed into a plane shape, and another of the pixel electrode and the common electrode provided closer to the liquid crystal layer having a plurality of slits formed therein; and illumination means serving as a light source for the liquid crystal display panel, in which the liquid crystal display panel further includes reflection means for reflecting light, the reflection means being formed at a surface of the liquid crystal display panel on the illumination means (backlight unit) side in a portion which overlaps, in plan view, an end portion of each of the plurality of slits in a long-side direction and a vicinity thereof, and an inner region of the each of the plurality of slits.

In the liquid crystal display device according to one embodiment of the present invention, the reflection means includes a metal layer, and the reflection means is formed separately from another metal layer different from the metal layer forming the reflection means.

In the liquid crystal display device according to another embodiment of the present invention, the reflection means is formed so that a distance from the end portion of the each of the plurality of slits in the long-side direction is within a range of larger than 0 μm and 4 μm or smaller.

In the liquid crystal display device according to still another embodiment of the present invention, the reflection means is formed so that a distance from the end portion of the each of the plurality of slits in the long-side direction is within a range of 2 µm or larger and 4 µm or smaller. In this range, the maximum transmittance increase rate can be obtained.

In the liquid crystal display device according to yet another embodiment off the present invention, the end portion of the each of the plurality of slits in the long-side direction has a shape in which one side of a pair of sides forming a width of the each of the plurality of slits in a short-side direction is inclined toward another side of the pair of sides so that the end portion is tapered, and the reflection means is formed from the another side different from the inclined side of the pair of sides up to substantially a center position of the width of the each of the plurality of slits in the short-side direction.

In the liquid crystal display device according to further another embodiment of the present invention, the reflection means includes: a base portion formed into a plane shape; and a plurality of protruding portions formed so as to protrude from the base portion, and each of the plurality of protruding portions is formed so as to overlap the end portion of the each of the plurality of slits from the another side different from the inclined side up to substantially the center position of the width of the each of the plurality of slits in the short-side direction.

In the liquid crystal display device according to yet still another embodiment of the present invention, the each of the plurality of slits is bent in a vicinity of the end portion thereof in the long-side direction and has a tapered shape, the reflection means includes: a base portion formed into a plane shape; and a plurality of protruding portions formed so as to protrude from the base portion, and each of the plurality of protruding portions is formed into a wedge shape in which a top end thereof is positioned at substantially a center of a width of the each of the plurality of slits in a short-side direction.

In the liquid crystal display device according to yet still another embodiment of the present invention, the each of the plurality of slits is bent, and the reflection means is formed so as to overlap a bent portion of the each of the plurality of slits.

In the liquid crystal display device according to yet still another embodiment of the present invention, the liquid crystal display panel further includes: a front-surface polarizing plate arranged on a display surface side of the liquid crystal display panel; a rear-surface polarizing plate arranged on a surface of the liquid crystal display panel on the illumination means side; and a reflection-type polarizing plate arranged on a surface of the rear-surface polarizing plate on the illumination means side, the reflection-type polarizing plate being configured to transmit linearly polarized light in a transmission axis direction of the rear-surface polarizing plate and reflect linearly polarized light in an absorption axis direction of the rear-surface polarizing plate.

In the liquid crystal display device according to yet still another embodiment of the present invention, the liquid crystal display panel further includes an underlayer having a lamination structure in which layers having different refractive indexes are laminated, the underlayer being formed on the illumination means side.

In the liquid crystal display device according to yet still another embodiment of the present invention, the reflection means is formed in the same layer as a layer in which a scanning signal line of the liquid crystal display panel is formed.

In the liquid crystal display device according to yet still another embodiment of the present invention, the reflection means is formed integrally with the pixel electrode of the liquid crystal display panel.

In the liquid crystal display device according to yet still another embodiment of the present invention, the reflection means is formed in a layer different from the another metal layer, and at a position on the illumination means (backlight unit) side.

In the liquid crystal display device according to yet still another embodiment of the present invention, the reflection means is further formed at a portion overlapping a video signal line of the liquid crystal display panel, and at a position on the illumination means (backlight unit) side.

The liquid crystal display panel forming the liquid crystal display device according to the present invention includes the reflection means for reflecting light, the reflection means being formed at the surface of the liquid crystal display panel on the illumination device (backlight unit) side in the region (domain) in which the transmittance becomes low because the liquid crystal molecules are aligned in a direction different from the desired direction. Therefore, illumination light entering the domain region, which has not conventionally been sufficiently used, can be effectively used. Thus, it is possible to achieve the liquid crystal display device having higher brightness or lower power consumption.

DETAILED DESCRIPTION OF THE INVENTION

Hereinafter, with reference to the drawings, exemplary embodiments of a liquid crystal display device according to the present invention are described in detail.

First Embodiment

Figure 1:
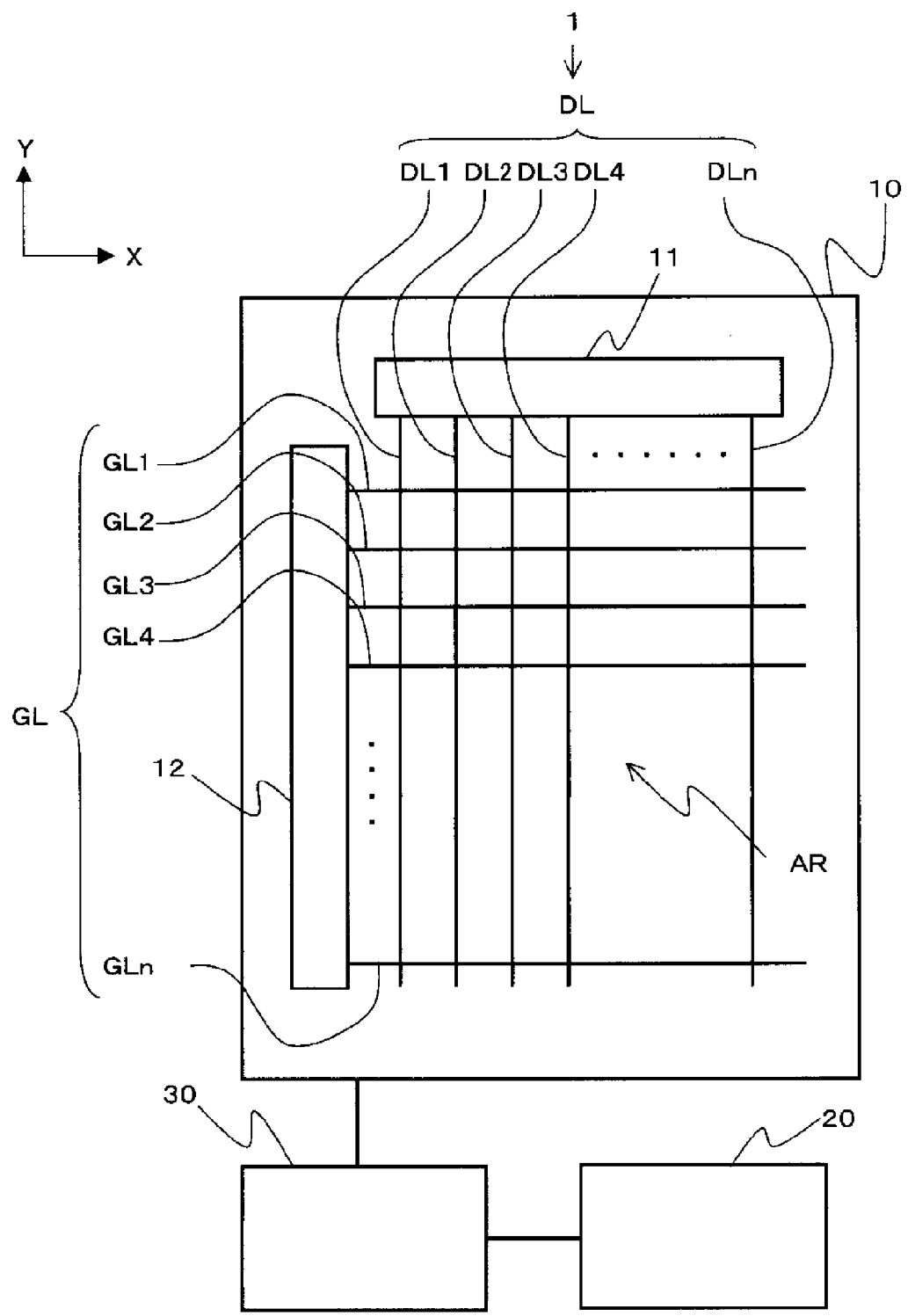
FIG. 1 is a schematic view illustrating a structure of a liquid crystal display device according to a first embodiment of the present invention.

FIG. 1 is a schematic view illustrating a structure of a liquid crystal display device 1 according to a first embodiment of the present invention. The liquid crystal display device 1 includes a liquid crystal display panel 10, a data drive circuit 11, a scanning drive circuit 12, a backlight unit 20, and a control section 30. The liquid crystal display panel 10 includes a plurality of video signal lines DL (DL1, . . . , DLi, . . . , DLn, where i and n each represent natural number) extending in a Y direction of FIG. 1, and a plurality of scanning signal lines GL (GL1, . . . , GLj, . . . , GLn, where j and n each represent natural number) extending in an X direction of FIG. 1. The liquid crystal display panel 10 has a display region AR provided in a region including a center portion.

The data drive circuit 11 generates a video signal (gradation voltage) to be input to each of the plurality of video signal lines DL.

The scanning drive circuit 12 sequentially inputs a scanning signal to the plurality of scanning signal lines GL. The data drive circuit 11 and the scanning drive circuit 12 are provided, for example, on the liquid crystal display panel 10, and are electrically connected to the liquid crystal display panel 10.

The backlight unit 20 is achieved by a light emitting diode and the like, and illuminates the liquid crystal display panel 10 from a rear surface thereof as illumination means. Further, the backlight unit 20 includes a reflection sheet (not shown). The reflection sheet efficiently reflects light emitted from the light emitting diode and the like toward the liquid crystal display panel 10.

The control section 30 is achieved by a semiconductor integrated circuit and the like, and is electrically connected to respective portions of the liquid crystal display device 1 including the data drive circuit 11, the scanning drive circuit 12, and the backlight unit 20, to thereby control the entire operation of the liquid crystal display device 1.

Figure 2:
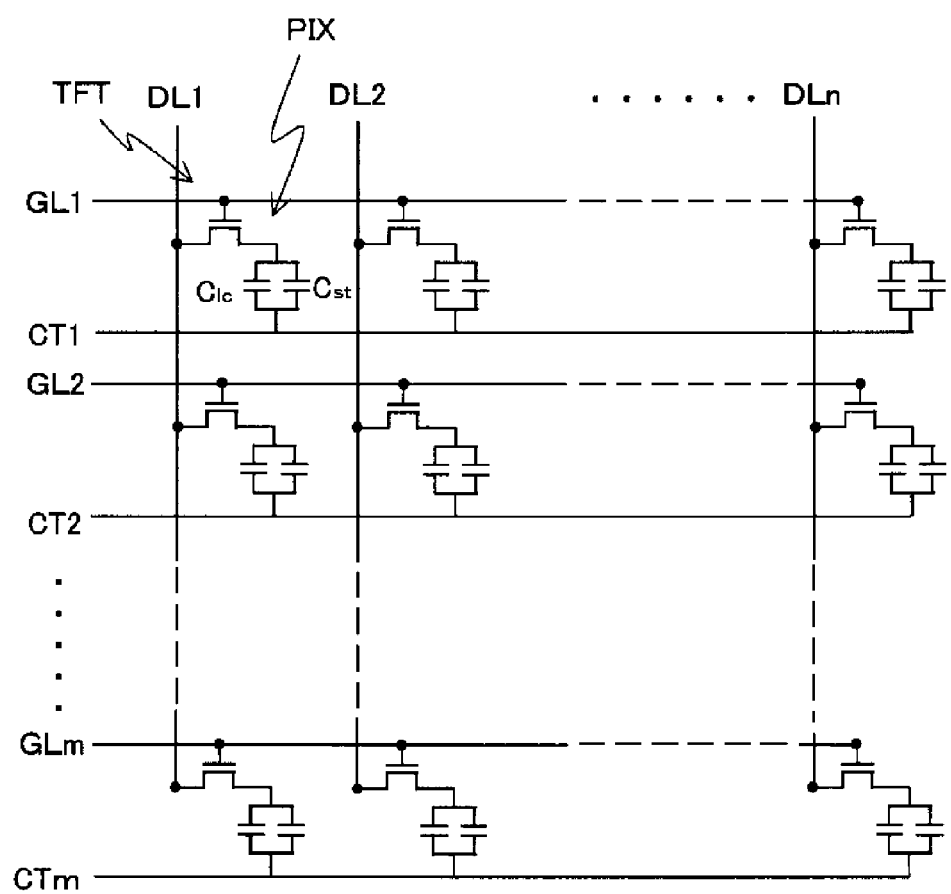
FIG. 2 is an equivalent circuit view of a display region of a liquid crystal display panel illustrated in FIG. 1.

Next, a structure of a pixel PIX of the liquid crystal display panel 10 is described. FIG. 2 is an equivalent circuit view of the display region AR of the liquid crystal display panel 10 illustrated in FIG. 1.

The liquid crystal display panel 10 includes, as illustrated in FIG. 2, the pixel PIX at a region surrounded by a pair of adjacent scanning signal lines GL and a pair of adjacent video signal lines DL. Each pixel PIX includes a thin film transistor TFT. Further, each pixel PIX includes a pixel electrode MIT, a common electrode CT (CT1, . . . , CTj, . . . , CTm, where j and m each represent natural number), a capacitance element Cst serving as a storage capacitance formed of an insulating layer sandwiched by the pixel electrode MIT and the common electrode CT, and a capacitance element Clc formed by a liquid crystal layer.

Figure 3:
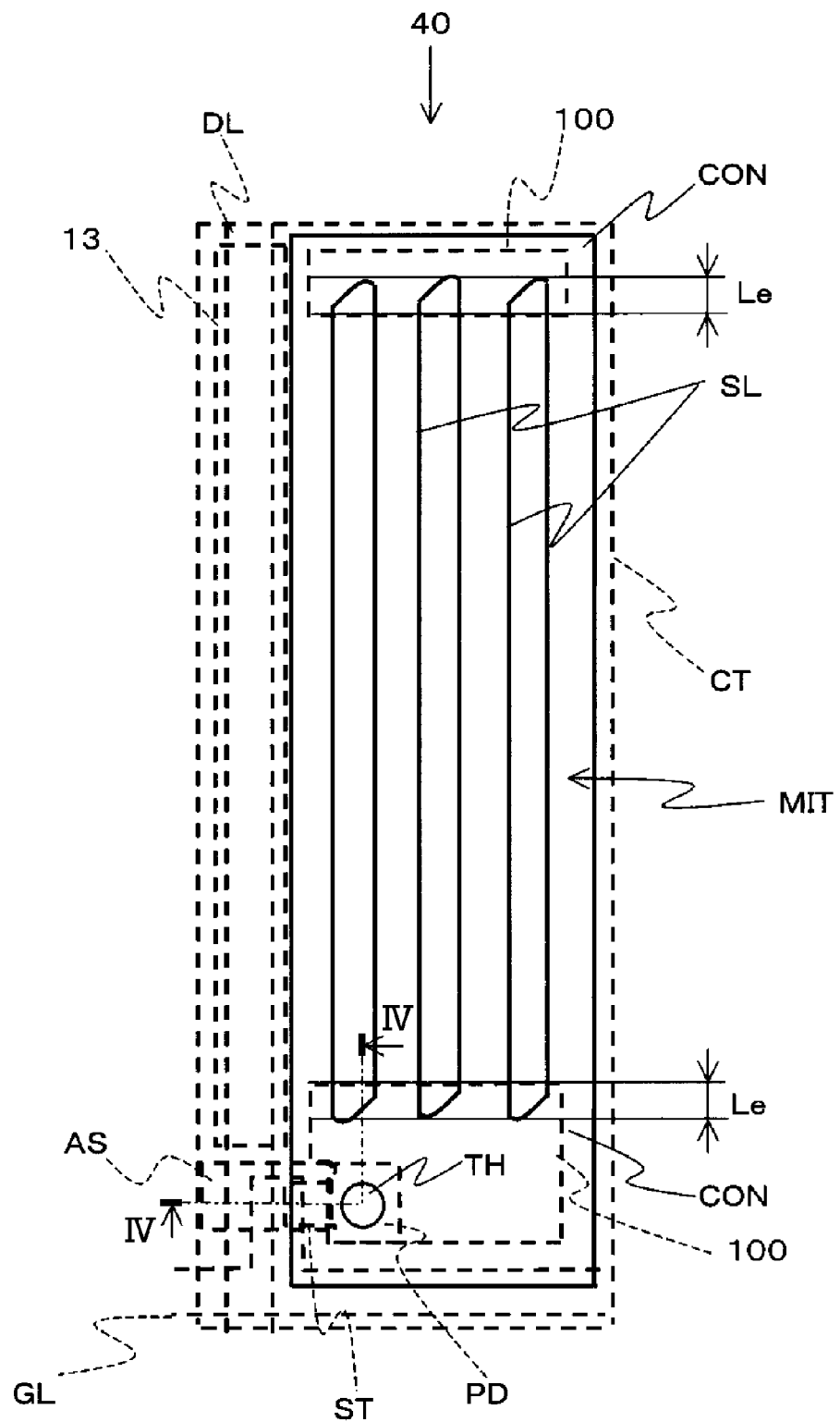
FIG. 3 is a plan view of a TFT substrate of the liquid crystal display panel when viewed from a surface thereof having a pixel electrode formed thereon.
Figure 4:
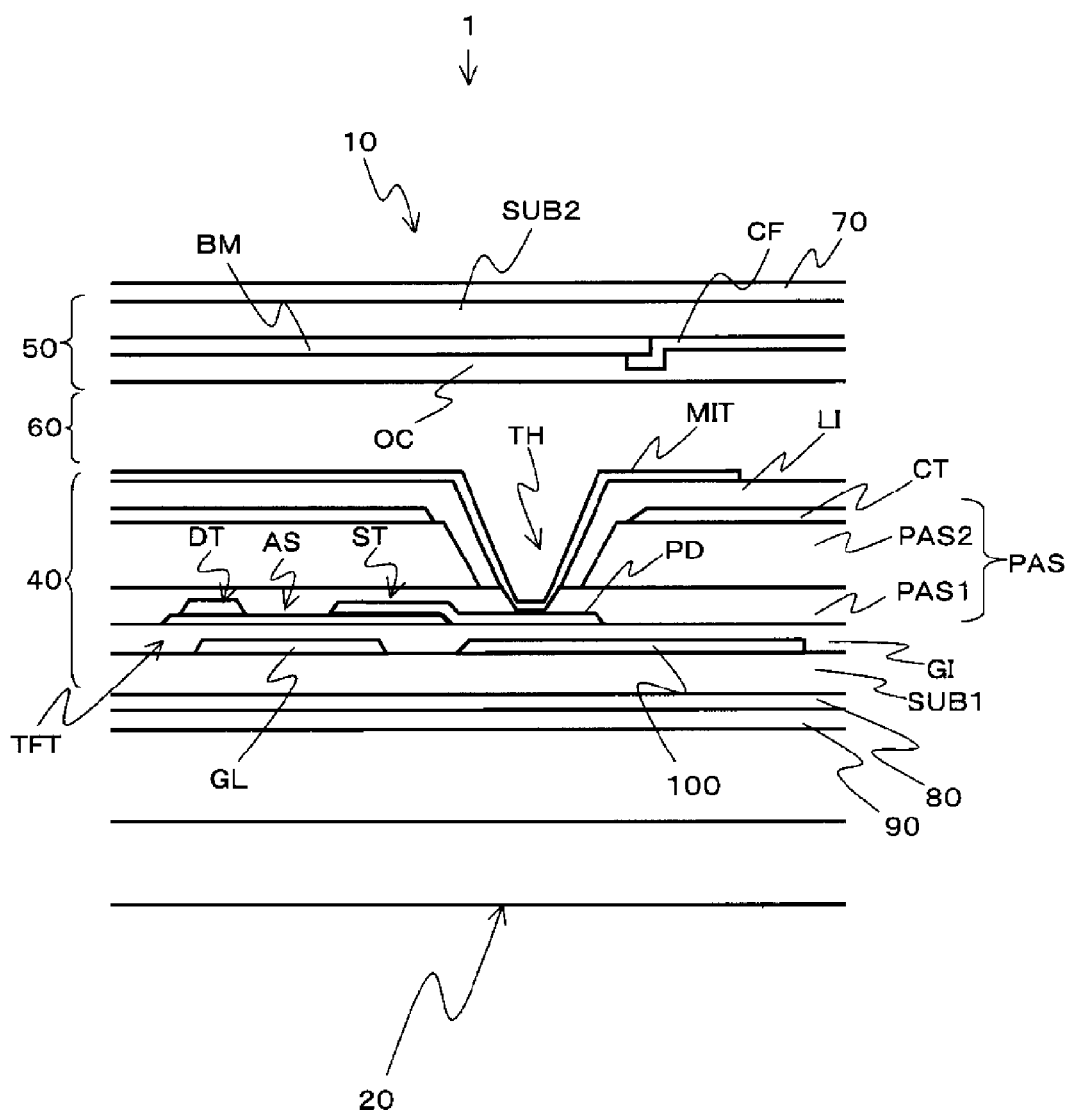
FIG. 4 is a sectional view of the liquid crystal display panel taken along the line IV-IV of the TFT substrate illustrated in FIG. 3.

Here, with reference to FIGS. 3 and 4, the liquid crystal display panel 10 is described in detail. FIG. 3 is a plan view of a TFT substrate 40 of the liquid crystal display panel 10 when viewed from a surface thereof having the pixel electrode MIT formed thereon. FIG. 4 is a sectional view of the liquid crystal display panel 10 taken along the line IV-IV of the TFT substrate illustrated in FIG. 3.

The liquid crystal display panel 10 includes, as illustrated in FIG. 4, the TFT substrate 40, a counter substrate 50, a liquid crystal layer 60 sandwiched between the TFT substrate 40 and the counter substrate 50, a pair of polarizing plates including a front-surface polarizing plate 70 and a rear-surface polarizing plate 80, and a reflection-type polarizing plate 90.

In the TFT substrate 40, on a surface of an insulating substrate SUB1 formed of, for example, a glass substrate on the liquid crystal layer 60 side, the scanning signal line GL and reflection means 13 and 100 are formed. The scanning signal line GL is made of a conductive metal material. Each of the reflection means 13 and 100 is made of a metal material in the same layer as the scanning signal line GL, and reflects light emitted from the backlight unit 20 toward the backlight unit 20. In order to enhance a brightness increase effect to be described later, each of the reflection means 13 and 100 is preferred to be made of a metal material having high reflectance. Specifically, as the material of the reflection means, aluminum, an alloy of aluminum and copper, or an alloy of aluminum and neodymium may be applied. In order to achieve reflection means having higher reflectance, silver or an alloy thereof may be used.

As illustrated in FIG. 3, the reflection means 13 is provided at a portion overlapping the video signal line DL in plan view.

Here, as illustrated in FIG. 3, for the sake of convenience, a region of the electrode in which end portions of the slits in a long-side direction thereof are closed is referred to as a connection portion CON of the electrode. The reflection means 100 is formed at a surface of the liquid crystal display panel 10 on the backlight unit 20 side in a portion which overlaps, in plan view, the connection portion CON side, that is, the end portion of the slit SL in the long-side direction and a vicinity thereof, and an inner region of the slit SL in the vicinity of the end portion of the slit SL in the long-side direction. The reflection means 100 serves as reflection means for reflecting light. The reflection means 100 is formed of a metal layer having a rectangular shape, and is arranged separately from another metal layer different from the metal layer forming the reflection means 100, for example, the scanning signal line GL formed in the same layer.

Further, as necessary, the reflection means 100 is also arranged at a position that overlaps, in plan view, a position corresponding to a non-opening portion in which a light shielding film BM, a spacer (not shown), and the like are arranged.

Therefore, part of illumination light entering the liquid crystal display panel reaches the reflection means 13 and 100 to be reflected toward the backlight unit 20. The light reflected toward the backlight unit 20 is reflected by a component member such as the reflection sheet (not shown) of the backlight unit 20 toward the liquid crystal display panel 10 so as to be reused.

On a surface of the insulating substrate SUB1, an insulating film GI is formed so as to cover the scanning signal line GL. The insulating film GI serves as a gate insulating film in a formation region of the thin film transistor TFT described later.

On a surface of the insulating film GI, and in the formation region of the thin film transistor TFT which overlaps a part of the scanning signal line GL, for example, there is formed a semiconductor layer AS made of amorphous Si and formed into an island shape. By forming a drain electrode DT and a source electrode ST arranged opposed to each other on a surface of the semiconductor layer AS, the thin film transistor TFT constructs a transistor having a gate electrode formed of the part of the scanning signal line GL.

On the surface of the insulating substrate SUB1, the video signal line DL is formed. A part of the video signal line DL is extended on the surface of the semiconductor layer AS so that the extended portion serves as the drain electrode DT of the thin film transistor TFT. Further, when the drain electrode DT is formed, the source electrode ST of the thin film transistor TFT is formed. The source electrode ST is formed so as to include a pad portion PD formed beyond the formation region of the semiconductor layer AS to extend into a pixel region. The pad portion PD is formed as a portion to be electrically connected to the pixel electrode MIT described later.

On the surface of the insulating substrate SUB1, an insulating film PAS is formed so as to cover the video signal line DL and the like. The insulating film PAS has a lamination structure of, for example, a protective film PAS1 formed of an inorganic insulating film and a protective film PAS2 formed of an organic insulating film.

On a surface of the insulating film PAS, each common electrode CT is formed. The common electrode CT is formed of, for example, a translucent conductive film made of indium tin oxide (ITO). The common electrode CT is formed into a uniform plane shape without a space, that is, formed into a so-called solid shape.

On the surface of the insulating substrate SUB1, an insulating film LI formed of an inorganic insulating film is formed so as to cover the common electrode CT. On an upper surface of the insulating film LI, the pixel electrode MIT is formed for each pixel region. The insulating film LI functions as an interlayer insulating film between the pixel electrode MIT and the common electrode CT. A part of the pixel electrode MIT is electrically connected to the pad portion PD of the source electrode ST via a through hole TH formed through the insulating film LI and the insulating film PAS.

The pixel electrode MIT is formed of, for example, a translucent conductive film made of ITO, and slits SL each having closed end portions are formed therein. Each of the slits SL of the pixel electrode MIT is desired to be shaped so that a region (domain) in which a transmittance becomes low is small, and the domain does not easily move or develop by an external force. For example, it is effective to form the end portion of the slit SL in the long-side direction into an inclined tapered shape in which one side of a pair of sides forming the width of the slit SL in a short-side direction thereof is inclined toward the other side thereof so that the end portion is tapered. Note that, the shape of the slit SL that is effective against the domain is not limited to the inclined tapered shape, and, for example, may alternatively be a shape in which the slit SL is bent in the vicinity of the end portion of the slit SL in the long-side direction and further the end portion is tapered (hereinafter, referred to as crab leg shape).

Further, on the surface of the pixel electrode MIT, that is, on a surface of the TFT substrate 40 to be held in contact with the liquid crystal layer 60, an alignment film (not shown) is formed.

In the counter substrate 50, the light shielding film BM corresponding to what is called a black matrix and a color filter CF are provided on a surface of an insulating substrate SUB2 formed of, for example, a glass substrate. The light shielding film BM is formed by, for example, processing a conductive film or an insulating film, which has substantially zero light transmittance, by photolithography, to thereby be selectively formed between the respective pixels PIX. Further, the color filter CF is formed by photolithography or printing so that a filter for red (R) display, a filter for green (G) display, and a filter for blue (B) display are periodically arrayed. On the light shielding film BM and the color filter CF, an overcoat layer OC is formed as necessary, and further on the overcoat layer OC, an alignment film (not shown) is formed.

The front-surface polarizing plate 70 is arranged on a surface of the insulating substrate SUB2 on a side opposite to the liquid crystal layer 60. The front-surface polarizing plate 70 absorbs linearly polarized light in a predetermined direction, and transmits linearly polarized light having an oscillation plane orthogonal to that of the above-mentioned linearly polarized light in the predetermined direction. That is, the front-surface polarizing plate has an absorption axis for absorption of predetermined linearly polarized light, and a transmission axis for transmission of linearly polarized light having an oscillation plane orthogonal to that of the linearly polarized light to be absorbed.

The rear-surface polarizing plate 80 is arranged on a surface of the insulating substrate SUB1 on a side opposite to the liquid crystal layer 60, that is, on the rear surface side of the liquid crystal display panel 10. The rear-surface polarizing plate 80 absorbs linearly polarized light in a predetermined direction, and transmits linearly polarized light having an oscillation plane orthogonal to that of the above-mentioned linearly polarized light in the predetermined direction. That is, the rear-surface polarizing plate 80 has an absorption axis for absorption of predetermined linearly polarized light, and a transmission axis for transmission of linearly polarized light having an oscillation plane orthogonal to that of the linearly polarized light to be absorbed.

The reflection-type polarizing plate 90 is adhered to a surface of the rear-surface polarizing plate 80 on a side opposite to a surface on the liquid crystal layer 60 side. The reflection-type polarizing plate 90 transmits linearly polarized light in the transmission axis direction of the rear-surface polarizing plate 80, and reflects linearly polarized light in the absorption axis direction of the rear-surface polarizing plate 80.

Next, the reflection means 100 is described in detail.

The reflection means 100 is formed so that a distance Le from the end portion of the slit SL in the long-side direction is within a predetermined range.

Figure 5:
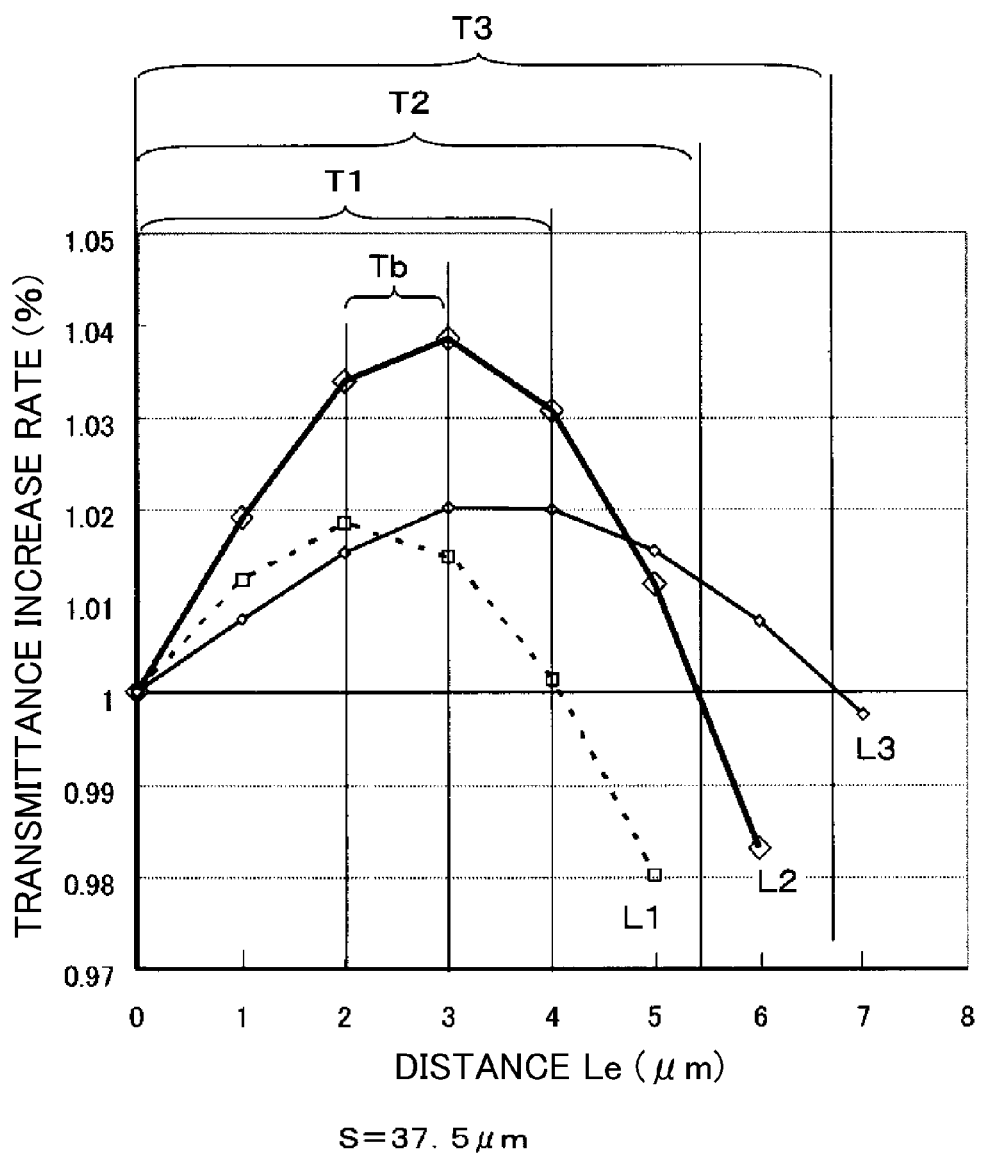
FIG. 5 is a graph illustrating a relationship between a transmittance increase rate for each slit having a shape in which a dimension of the slit in a long-side direction thereof is 37.5 µm, and a distance from an end portion of the slit in the long-side direction to an end portion of reflection means.
Figure 6:
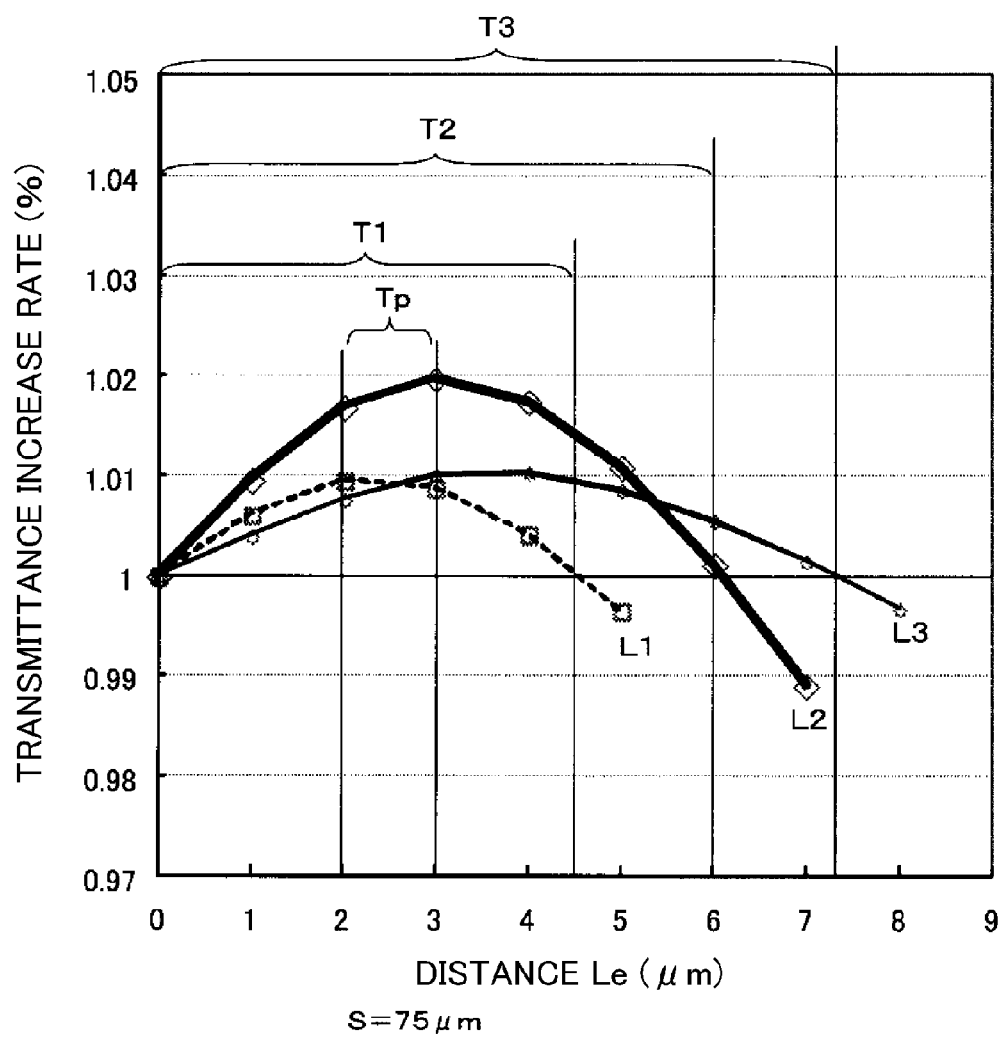
FIG. 6 is a graph illustrating a relationship between a transmittance increase rate for each slit having a shape in which the dimension of the slit in the long-side direction is 75 µm, and the distance from the end portion of the slit in the long-side direction to the end portion of the reflection means.

Here, with reference to FIGS. 5 and 6, the reason why the reflection means 100 is formed so that the distance Le from the end portion of the slit SL in the long-side direction is within the predetermined range is described.

FIG. 5 is a graph illustrating a relationship between a transmittance increase rate for each slit SL having a shape in which a dimension S in the long-side direction is 37.5 µm, and the distance Le from the end portion of the slit SL in the long-side direction to an end portion of the reflection means 100.

FIG. 6 is a graph illustrating a relationship between a transmittance increase rate for each slit SL having a shape in which a dimension S in the long-side direction of the slit SL is 75 µm, and the distance Le from the end portion of the slit SL in the long-side direction to an end portion of the reflection means 100.

Note that, in FIGS. 5 and 6, there are obtained calculation values of a case where a reflectance of the reflection means 100 is 88%.

Further, in FIGS. 5 and 6, the vertical axis represents the transmittance increase rate, and the horizontal axis represents the distance Le from the end portion of the slit SL in the long-side direction to the end portion of the reflection means 100.

Further, L1 in FIGS. 5 and 6 represents the case where the slit having the inclined tapered shape is employed, and L2 in FIGS. 5 and 6 represents the case where the slit having the crab leg shape is employed.

Note that, L3 in FIGS. 5 and 6 represents the case of using reflection means 101 of a second embodiment of the present invention described later.

As illustrated in FIGS. 5 and 6, when defining by the distance Le from the end portion of the slit SL in the long-side direction, in the case where the slit SL has the inclined tapered shape, a range T1 of the distance Le, which enables obtaining an effective transmittance increase effect by the reflection means 100 formed at the end portion of the slit SL, is 0<Le≤4 µm.

Meanwhile, in the case where the slit SL has the crab leg shape, a range T2 of the distance Le, which enables obtaining an effective transmittance increase effect by the reflection means 100 formed at the end portion of the slit SL, is wider than the range T1 of the case employing the slit having the inclined tapered shape. Therefore, when the distance Le is within the range of 0<Le≤4 µm, regardless of the end portion shape of the slit SL, it is possible to obtain an effective transmittance increase effect by the reflection means 100.

Further, as illustrated in FIGS. 5 and 6, a range Tb in which the transmittance increase effect by the reflection means 100 arranged at the end portion of the slit SL becomes high (range including the distance Le causing the maximum transmittance increase effect) is 2 µm≤Le≤3 µm, and hence the distance Le is desired to be set within this range.

Further, when FIGS. 5 and 6 are compared to each other, as the dimension of the slit SL in the long-side direction becomes larger, that is, as the size of the pixel PIX becomes larger, the range of the distance Le, which enables obtaining the effect, becomes wider. However, even in the case employing the slit having the crab leg shape, which enables obtaining the effect in a wider range, when the distance Le exceeds 6 µm, the effect cannot be obtained. Therefore, when the reflection means 100 uniformly covers the end portions of the plurality of slits SL, the distance Le is required at least to be 6 µm or smaller.

Further, as the dimension of the slit SL in the long-side direction becomes larger, the transmittance increase rate itself decreases, and hence the most appropriate design may be set while considering this relationship.

In the liquid crystal display device 1 according to the first embodiment of the present invention, the liquid crystal display panel 10 includes the reflection means 100 formed on a surface of the liquid crystal display panel 10 on the backlight unit 20 side in a portion which overlaps, in plan view, the end portion of the slit SL in the long-side direction and a vicinity thereof, and the inner region of the slit SL. That is, the liquid crystal display panel 10 includes the reflection means for reflecting light, the reflection means being formed at the surface of the liquid crystal display panel on the illumination device (backlight unit) side in a region (domain) in which a transmittance becomes low because the liquid crystal molecules are aligned in a direction different from the desired direction. Therefore, illumination light entering the domain region, which has conventionally been a loss, is reflected toward the backlight unit, and hence the light can be effectively reused. Thus, it is possible to achieve the liquid crystal display device having higher brightness or lower power consumption.

Further, in the liquid crystal display device 1 according to the first embodiment of the present invention, the reflection means 100 is formed separately from the another metal layer which is different from the metal layer forming the reflection means 100. That is, the reflection means 100 is electrically separated from a metal layer forming another electrode, and hence no adverse effect is exerted on the driving of the liquid crystal and the like.

Further, in the liquid crystal display device 1 according to the first embodiment of the present invention, the reflection means 100 is formed on the insulating substrate SUB1 forming the liquid crystal display panel at a position closest to the backlight unit 20. That is, light emitted from the backlight unit 20 can be reflected toward the backlight unit 20 at a position closer to the backlight unit 20 of the liquid crystal display panel 10. Therefore, light having smaller attenuation can be reflected toward the backlight unit 20 to be reused, and thus higher brightness can be achieved.

Further, in the liquid crystal display device 1 according to the first embodiment of the present invention, the reflection means 100 is formed of a layer forming the scanning signal line GL, that is, an existing metal layer. Therefore, the reflection means 100 can be formed in the same step of forming the scanning signal line GL, resulting in that the reflection means 100 can be formed without increasing the manufacturing cost.

Second Embodiment

Figure 7:
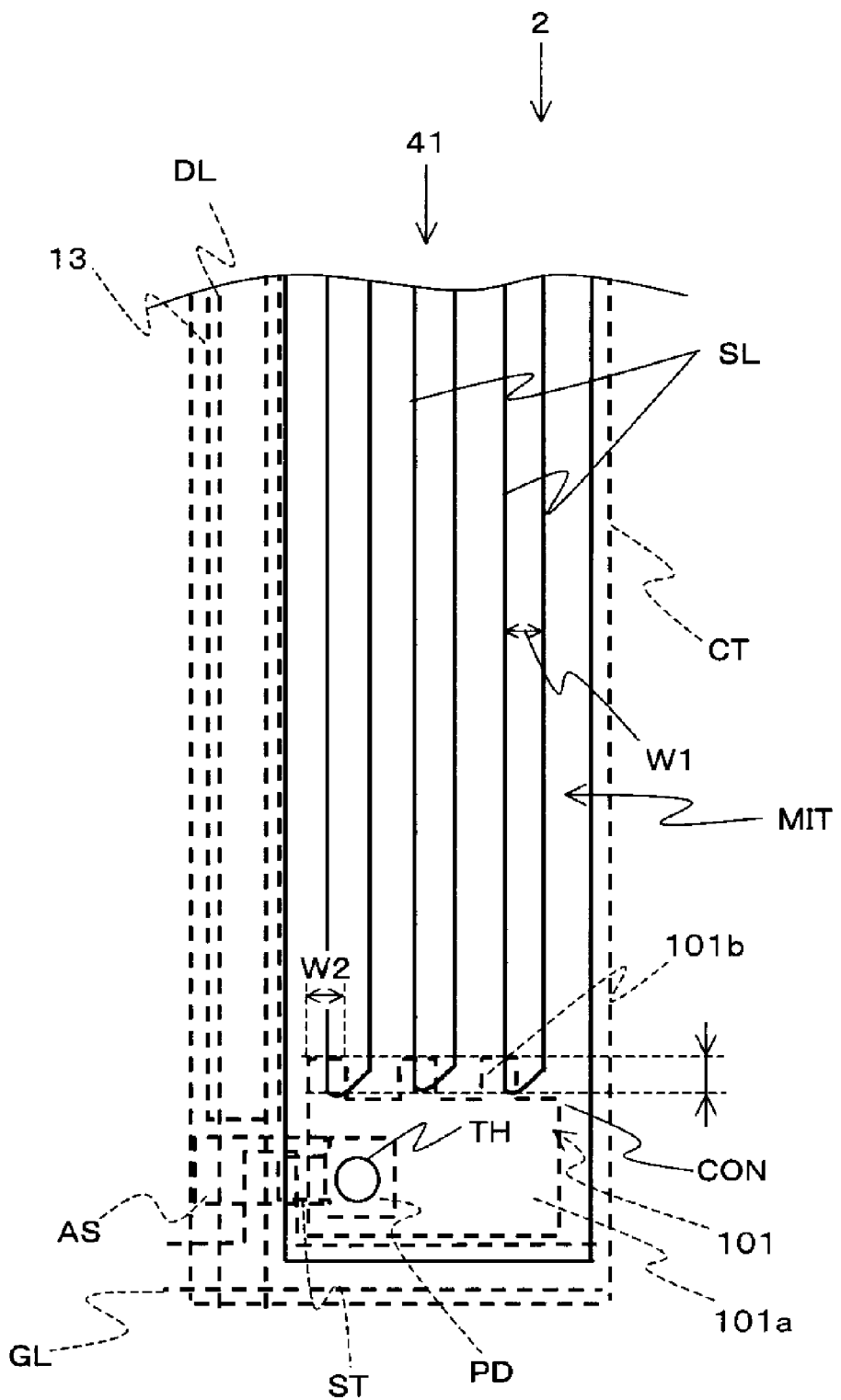
FIG. 7 is a plan view of a TFT substrate of a liquid crystal display device according to a second embodiment of the present invention when viewed from a surface thereof having a pixel electrode formed thereon.
Figure 8:
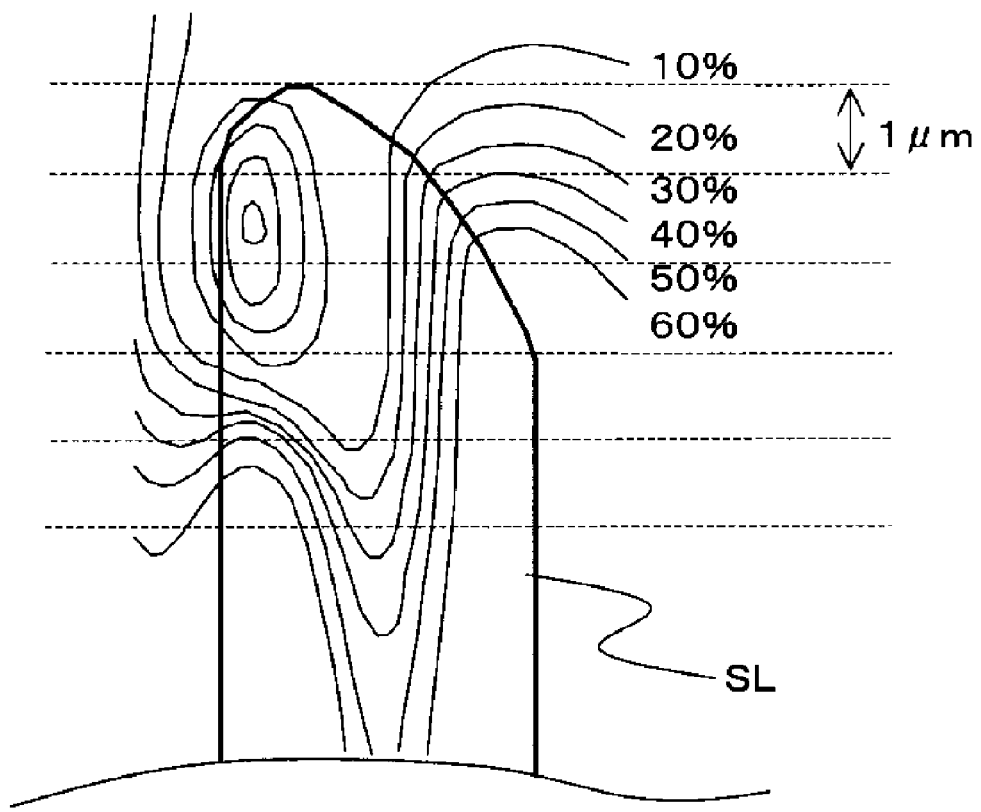
FIG. 8 is a view illustrating a shape of an end portion of the slit together with an equi-transmittance diagram.

Next, a second embodiment of the present invention is described with reference to FIGS. 7 and 8. FIG. 7 is a plan view of a TFT substrate 41 of a liquid crystal display device 2 according to the second embodiment of the present invention when viewed from a surface thereof having the pixel electrode MIT formed thereon. FIG. 8 is a view illustrating the shape of the end portion of the slit SL in the long-side direction together with an equi-transmittance diagram.

Note that, the equi-transmittance diagram in FIG. 8 represents display efficiency determined by an alignment state of the liquid crystal during driving, that is, a transmittance (100% in a case where the liquid crystal is in an ideal alignment state), which is determined only by the alignment state of the liquid crystal without considering absorption in the members such as the polarizing plate.

The liquid crystal display device 2 of the second embodiment differs in structure from the liquid crystal display device 1 of the first embodiment in that the TFT substrate 41 includes reflection means 101 in place of the reflection means 100. The reflection means 101 is formed correspondingly to a transmittance distribution determined by the slit SL having the inclined tapered shape. Note that, the same components as those in the above-mentioned embodiment are represented by the same reference symbols.

As illustrated in FIG. 8, at the end portion of the slit SL in the long-side direction and in the periphery thereof, the transmittance distribution is non-uniform reflecting that the alignment state of the liquid crystal is non-uniform. Therefore, by appropriately shaping the reflection means 101 in accordance with the shape of the end portion of the slit SL, it is possible to effectively cover the low transmittance region.

As illustrated in FIG. 7, the end portion of the slit SL in the long-side direction has the same shape as that in the first embodiment. That is, the end portion of the slit SL in the long-side direction has a tapered shape in which one side of a pair of sides forming a width W1 of the slit SL in the short-side direction is inclined toward the other side thereof.

As illustrated in FIG. 7, the reflection means 101 is formed from the other side different from the inclined side of the sides forming the end portion of the slit up to substantially a center position of the width W1 of the slit SL in the short-side direction. Specifically, the reflection means 101 includes a rectangular base portion 101a which is formed into a plane shape, and rectangular protruding portions 101b which are each formed into a rectangular shape so as to protrude from the base portion 101a.

Each of the rectangular protruding portions 101b is formed from the other side different from the inclined side up to substantially the center position of the width W1 of the slit SL in the short-side direction. That is, each of the rectangular protruding portions 101b is formed so as to overlap the slit by about a half of the slit width W1.

The reflection means 101 efficiently covers the low transmittance region illustrated in FIG. 8.

Specifically, a width W2 of the rectangular protruding portion 101b in the short-side direction of the slit SL is preferred to be set so that the region having a transmittance of 30% or smaller is covered, that is, the width W2 is nearly equal to the width W1 of the slit SL, or slightly smaller than the width W1 of the slit SL.

When such reflection means 101 is provided, as represented by L3 in FIGS. 5 and 6, when compared to L1 corresponding to the case where the shape of the slit SL in the long-side direction is the same inclined tapered shape, the size of the reflection means which enables obtaining the transmittance increase effect, that is, the range of the distance Le of the reflection means from the end portion of the slit SL increases by 2 µm or larger. For example, referring to FIG. 5, the effect can be obtained when the distance Le is within a range T3 of 0<Le≤6.8 µm. In other words, in this embodiment, it is possible to obtain an effect of increasing the likelihood with respect to a positional deviation between the reflection means and the end portion of the slit SL.

In the liquid crystal display device 2 of the second embodiment, the reflection means 101 is formed into a shape corresponding to the transmittance distribution illustrated in FIG. 8. That is, the reflection means 101 is formed into a shape corresponding to the transmittance distribution which changes depending on the shape of the slit SL. Therefore, a higher transmittance increase effect can be obtained.

Third Embodiment

Figure 9:
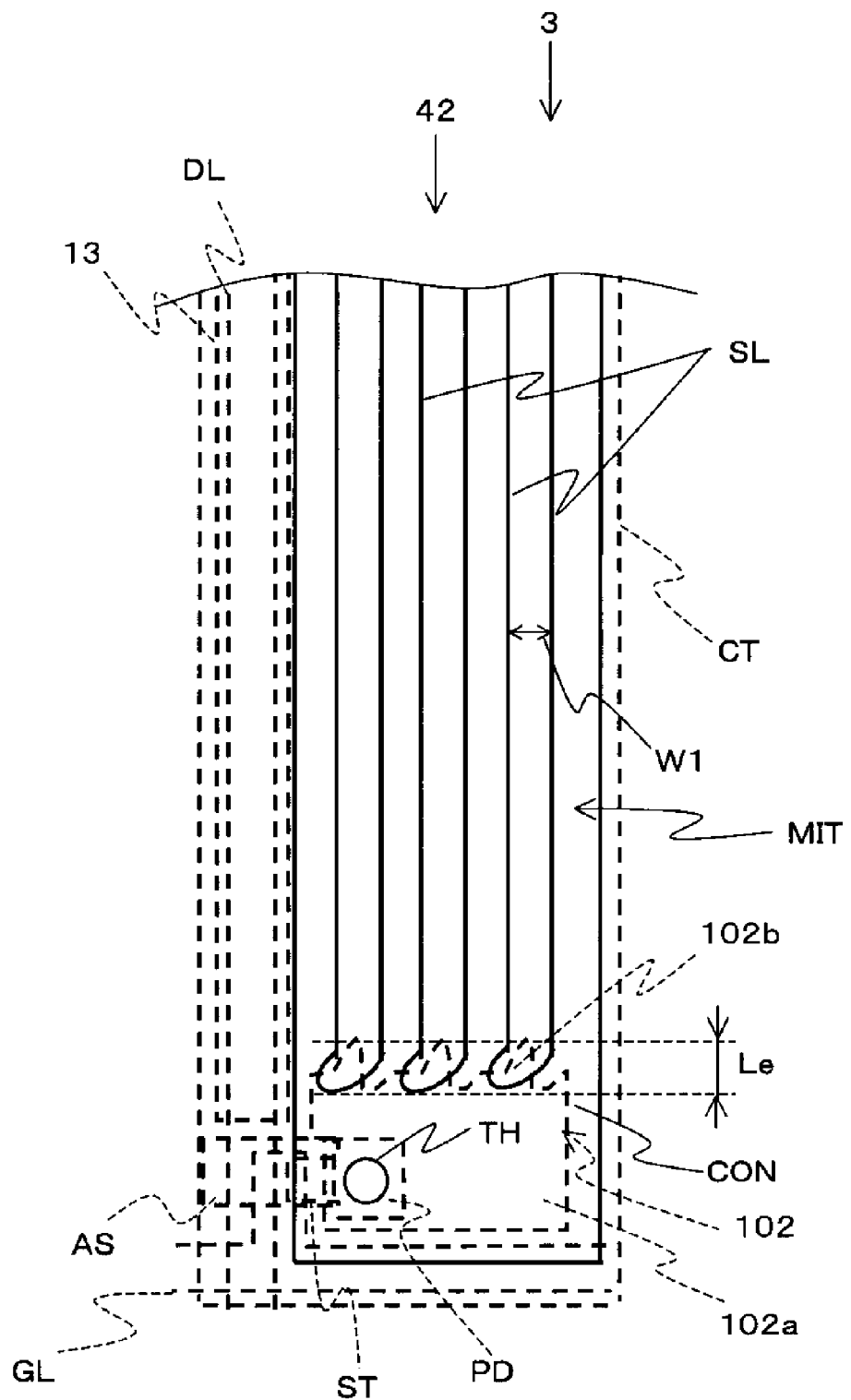
FIG. 9 is a plan view of a TFT substrate of a liquid crystal display device according to a third embodiment of the present invention when viewed from a surface thereof having a pixel electrode formed thereon.
Figure 10:
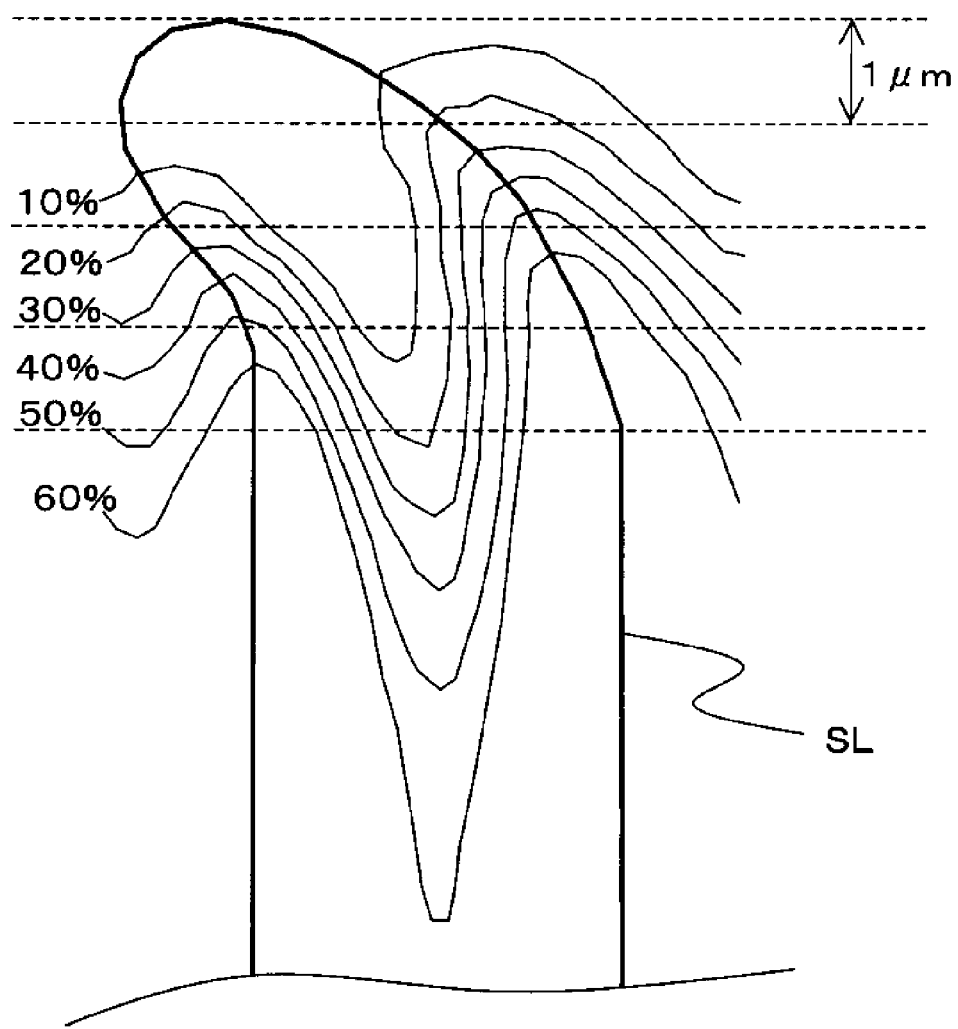
FIG. 10 is a view illustrating a shape of an end portion of a slit together with an equi-transmittance diagram.

Next, a third embodiment of the present invention is described with reference to FIGS. 9 and 10. FIG. 9 is a plan view of a TFT substrate 42 of a liquid crystal display device 3 according to the third embodiment of the present invention when viewed from a surface thereof having the pixel electrode MIT formed thereon. FIG. 10 is a view illustrating the shape of the end portion of the slit SL together with an equi-transmittance diagram. Note that, the equi-transmittance diagram in FIG. 10 represents display efficiency determined by the alignment state of the liquid crystal during driving, that is, the transmittance (100% in the case where the liquid crystal is in the ideal alignment state), which is determined only by the alignment state of the liquid crystal without considering absorption in the members such as the polarizing plate.

The liquid crystal display device 3 of the third embodiment differs in structure from the liquid crystal display device 1 of the first embodiment in that the TFT substrate 42 includes the slit SL having the crab leg shape and reflection means 102 is provided in place of the reflection means 100. The reflection means 102 is formed correspondingly to the transmittance distribution determined by the slit SL having the crab leg shape. Note that, the same components as those in the above-mentioned embodiments are represented by the same reference symbols.

As illustrated in FIG. 9, the reflection means 102 includes a rectangular base portion 102a which is formed into a plane shape, and wedge protruding portions 102b which are each formed into a wedge shape so as to protrude from the base portion 102a.

Each of the wedge protruding portions 102b is formed into a wedge shape in which a top end thereof is positioned at substantially the center of the width W1 of the slit SL in the short-side direction.

In the liquid crystal display device 3 of the third embodiment, the reflection means 102 is formed into a shape corresponding to the transmittance distribution illustrated in FIG. 10. That is, the reflection means 102 is formed into a shape corresponding to the transmittance distribution which changes depending on the shape of the slit SL. Therefore, a higher transmittance increase effect can be obtained.

Fourth Embodiment

Figure 11:
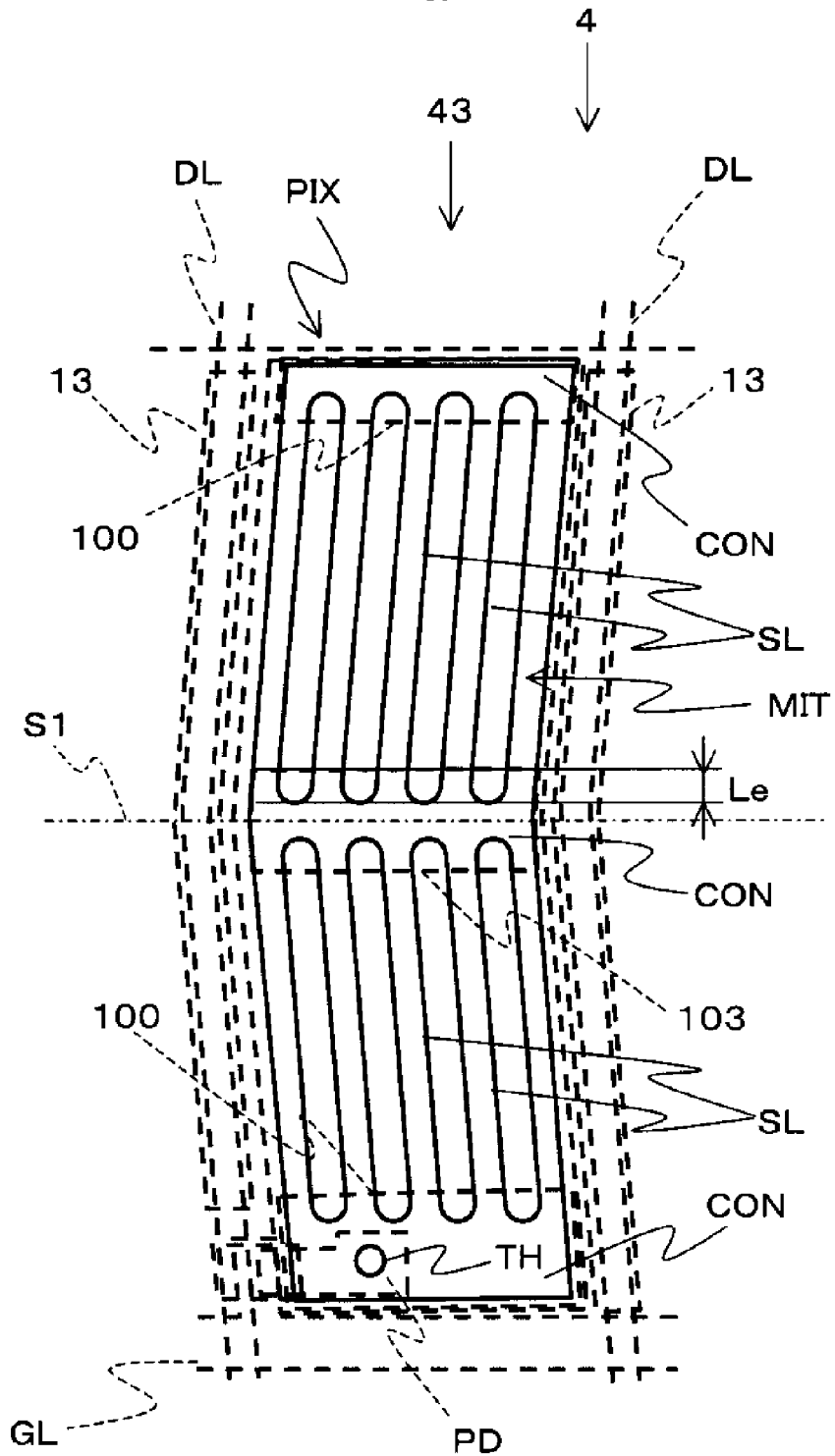
FIG. 11 is a plan view of a TFT substrate of a liquid crystal display device according to a fourth embodiment of the present invention when viewed from a surface thereof having a pixel electrode formed thereon.

Next, a fourth embodiment of the present invention is described with reference to FIG. 11. FIG. 11 is a plan view of a TFT substrate 43 of a liquid crystal display device 4 according to the fourth embodiment of the present invention when viewed from a surface thereof having the pixel electrode MIT formed thereon.

The liquid crystal display device 4 of the fourth embodiment employs a multi-domain type liquid crystal display device. In the liquid crystal display device 4, the slits SL of the pixel electrode MIT are separated at a center portion of the pixel electrode MIT and directed in different directions. In this manner, an alignment change of the liquid crystal at the time of electric field application is changed. Note that, in the liquid crystal display device 4 of the fourth embodiment, the end portion of the slit SL has a semicircular shape.

As illustrated in FIG. 11, the slits SL of the pixel electrode MIT are separated at the center portion of the pixel PIX, and are tilted in directions to be symmetric with respect to a line S1 at the center portion of the pixel PIX. A tilt angle of each slit SL ranges from ±5° to ±15° with respect to an extending direction of the video signal line DL.

In the TFT substrate 43 of the liquid crystal display device 4 of the fourth embodiment, reflection means 103 is provided at a position covering the line S1 at the center portion of the pixel PIX. Note that, the same components as those in the above-mentioned embodiments are represented by the same reference symbols.

The reflection means 103 is formed so as to be substantially symmetric with respect to the line S1 at the center portion of the pixel PIX corresponding to the separation portion of the slits SL.

The reflection means 103 is a metal layer formed at a surface of the liquid crystal display panel on the illumination device (backlight unit) side in a portion which covers, in plan view, the line S1 at the center portion of the pixel PIX, and overlaps the vicinity of the end portions of the adjacent slits in the long-side direction and parts of inner regions of both the adjacent slits. Further, the reflection means 103 is arranged separately from the another metal layer different from the metal layer forming the reflection means 103, for example, the scanning signal line GL formed in the same layer. The reflection means 103 is formed into a rectangular shape similarly to the reflection means 100 of the first embodiment.

In the liquid crystal display device 4 of the fourth embodiment, at the end portion of the slit SL in the long-side direction and at a portion in the pixel center portion in which the slits SL are separated, there is generated a region (domain) in which the transmittance becomes low because the liquid crystal molecules are not aligned in the desired direction. Also in this embodiment, the reflection means is formed in the region (domain) in which the transmittance becomes low. Therefore, illumination light entering the domain region, which has conventionally been a loss, is reflected toward the illumination device (backlight unit), and hence the light can be effectively reused. Thus, it is possible to achieve the liquid crystal display device having higher brightness or lower power consumption. Note that, in the liquid crystal display device 4 of the fourth embodiment, description is made of an example of a case where the end portion of the slit SL has a semicircular shape. When the end portion of the slit SL has a semicircular shape, the transmittance distribution thereof is substantially equal to the transmittance distribution determined by the slit SL having the inclined tapered shape. Therefore, the distance Le of the reflection means 103 from the end portion of the slit SL may be set similarly to that of the reflection means 100.

Fifth Embodiment

Figure 12:
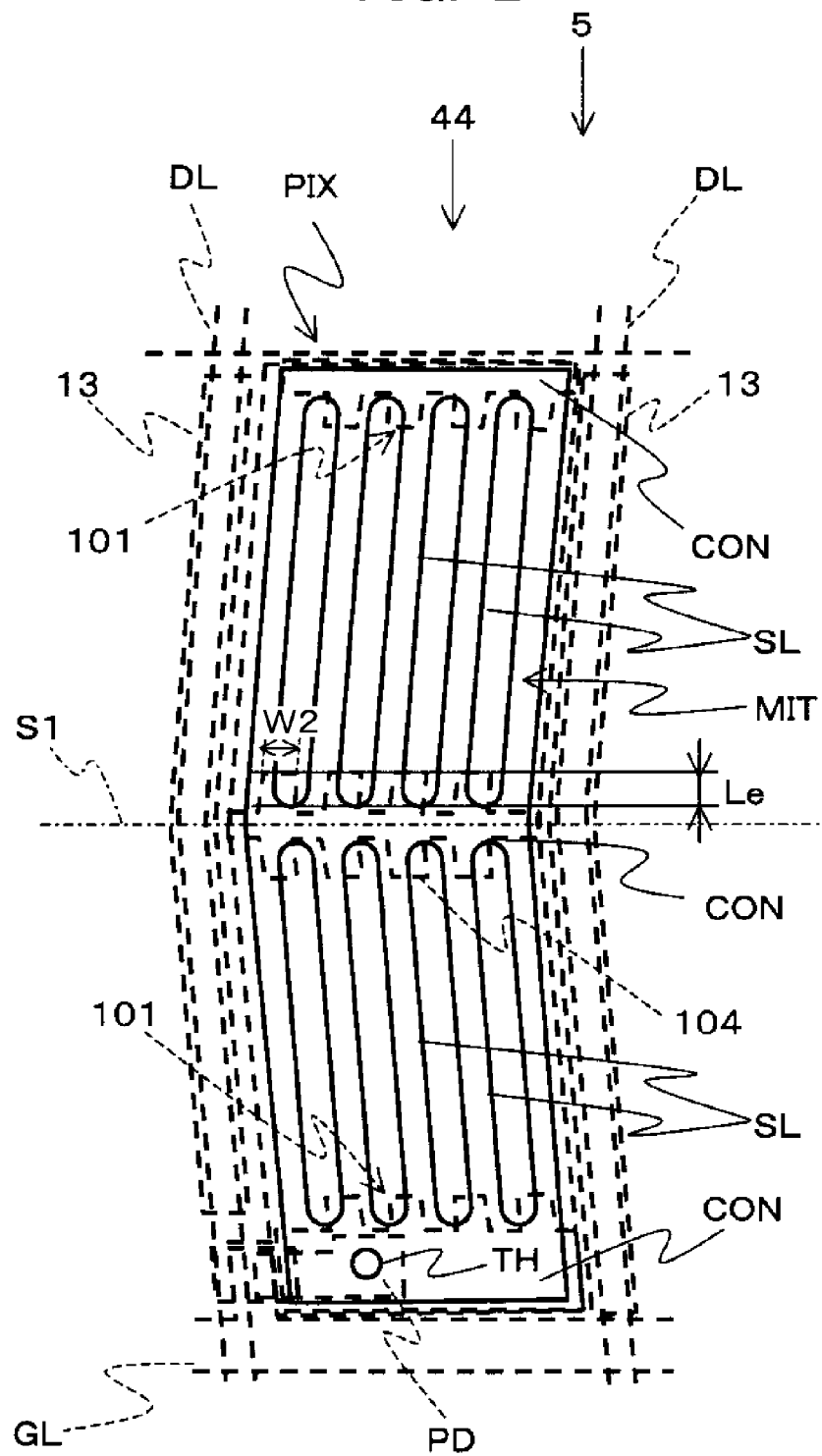
FIG. 12 is a plan view of a TFT substrate of a liquid crystal display device according to a fifth embodiment of the present invention when viewed from a surface thereof having a pixel electrode formed thereon.

Next, a fifth embodiment of the present invention is described with reference to FIG. 12. FIG. 12 is a plan view of a TFT substrate 44 of a liquid crystal display device 5 according to the fifth embodiment of the present invention when viewed from a surface thereof having the pixel electrode MIT formed thereon.

The liquid crystal display device 5 of the fifth embodiment employs, similarly to the liquid crystal display device 4 of the fourth embodiment, a multi-domain type liquid crystal display device in which the slits of the pixel electrode MIT are separated at the center portion of the pixel PIX.

In the TFT substrate 44 of the liquid crystal display device 5 of the fifth embodiment, reflection means 104 is provided. Note that, the same components as those in the above-mentioned embodiments are represented by the same reference symbols.

The reflection means 104 is formed at a position covering the center portion of the pixel PIX corresponding to the separation portion of the slits SL.

The reflection means 104 is a metal layer formed at a surface of the liquid crystal display panel on the illumination device (backlight unit) side in a portion which covers, in plan view, the line S1 at the center portion of the pixel PIX, and overlaps the vicinity of the end portions of the adjacent slits in the long-side direction and parts of inner regions of both the adjacent slits. Further, the reflection means 104 is arranged separately from the another metal layer different from the metal layer forming the reflection means 104, for example, the scanning signal line GL formed in the same layer. The reflection means 104 is formed into a shape similar to that of the reflection means 101 and arranged substantially symmetrical with respect to the line S1. Therefore, the distance Le of the reflection means 104 from the end portion of the slit SL is set similarly to that of the reflection means 101.

In the liquid crystal display device 5 of the fifth embodiment, as in the fourth embodiment described above, at the end portion of the slit SL in the long-side direction and at the portion in the pixel center portion in which the slits SL are separated, there is generated a region (domain) in which the transmittance becomes low because the liquid crystal molecules are not aligned in the desired direction. In this context, the reflection means 104 and 101 are formed in the region (domain) in which the transmittance becomes low. Therefore, the illumination light entering the domain region, which has conventionally been a loss, is reflected toward the illumination device (backlight unit), and hence the light can be effectively reused. Thus, it is possible to achieve the liquid crystal display device having higher brightness or lower power consumption.

Sixth Embodiment

Figure 13:
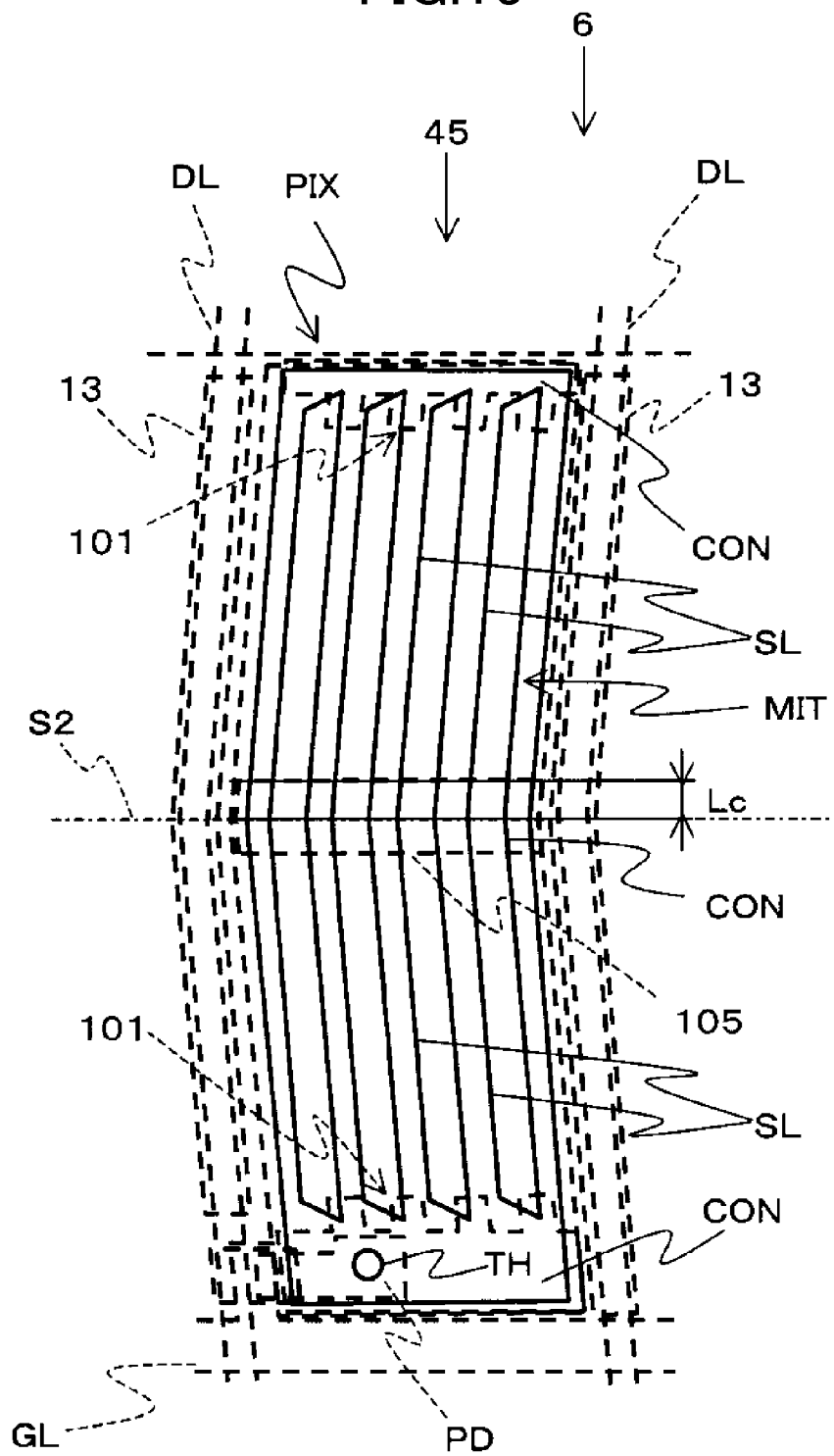
FIG. 13 is a plan view of a TFT substrate of a liquid crystal display device according to a sixth embodiment of the present invention when viewed from a surface thereof having a pixel electrode formed thereon.

Next, a sixth embodiment of the present invention is described with reference to FIG. 13. FIG. 13 is a plan view of a TFT substrate 45 of a liquid crystal display device 6 according to the sixth embodiment of the present invention when viewed from a surface thereof having the pixel electrode MIT formed thereon.

The liquid crystal display device 6 of the sixth embodiment employs a multi-domain type liquid crystal display device. Specifically, in the liquid crystal display device 6, the slit SL of the pixel electrode MIT is bent at the center portion of the pixel PIX. When the slit SL is bent at the center portion of the pixel PIX as described above, the domain (region in which the transmittance becomes low) is generated not only at the end portion of the slit SL but also at the bent portion of the slit SL.

In the TFT substrate 45 of the liquid crystal display device 6 of the sixth embodiment, reflection means 105 is provided. Note that, the same components as those in the above-mentioned embodiments are represented by the same reference symbols.

The reflection means 105 is a metal layer formed at a surface of the liquid crystal display panel on the illumination device (backlight unit) side in a region including a position (on the line S2) at which the slit SL of the pixel electrode MIT is bent. The reflection means 105 is arranged separately from the another metal layer different from the metal layer forming the reflection means 105, for example, the scanning signal line GL formed in the same layer. The reflection means 105 is formed so as to be substantially symmetric with respect to the line S2 at the center portion of the pixel PIX corresponding to the bent portion of the slit SL.

In the liquid crystal display device 6 of the sixth embodiment, at the position at which the slit SL is bent and in the vicinity thereof, there is generated a region (domain) in which the transmittance becomes low because the liquid crystal molecules are not aligned in the desired direction. The reflection means 105 is formed in the region (domain) in which the transmittance becomes low. Therefore, illumination light entering the domain region, which has conventionally been a loss, is reflected toward the illumination device (backlight unit), and hence the light can be effectively reused. Thus, it is possible to achieve the liquid crystal display device having higher brightness or lower power consumption.

Note that, the size of the reflection means 105 may be determined by a distance Lc from the bent portion of the slit SL, that is, the line S2. When the distance Lc is selected from a range of, for example, $0 < Lc \leq 4$ µm, the brightness increase effect can be obtained.

Seventh Embodiment

Figure 14:
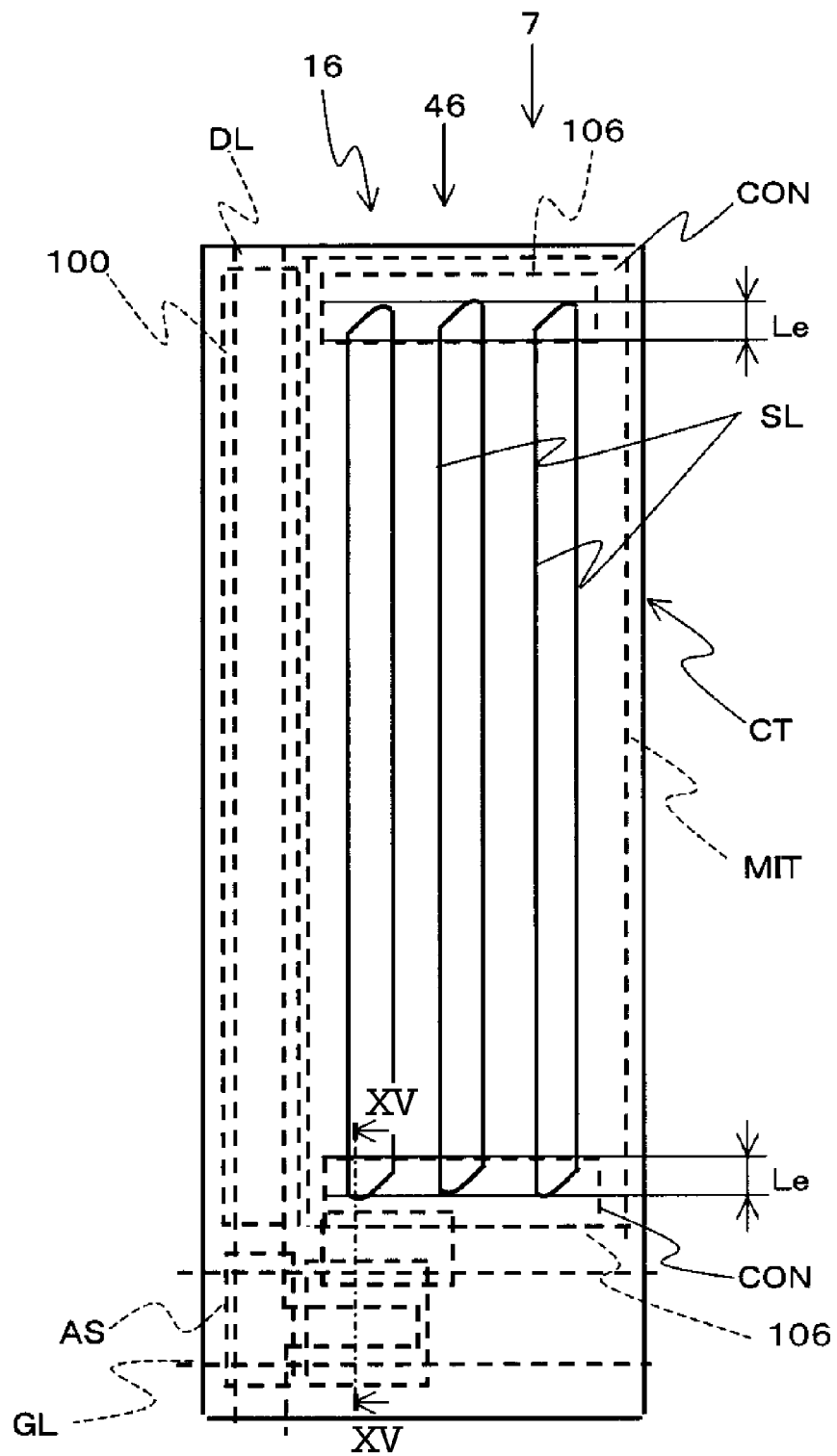
FIG. 14 is a plan view of a TFT substrate of a liquid crystal display device according to a seventh embodiment of the present invention when viewed from a surface thereof having a pixel electrode formed thereon.
Figure 15:
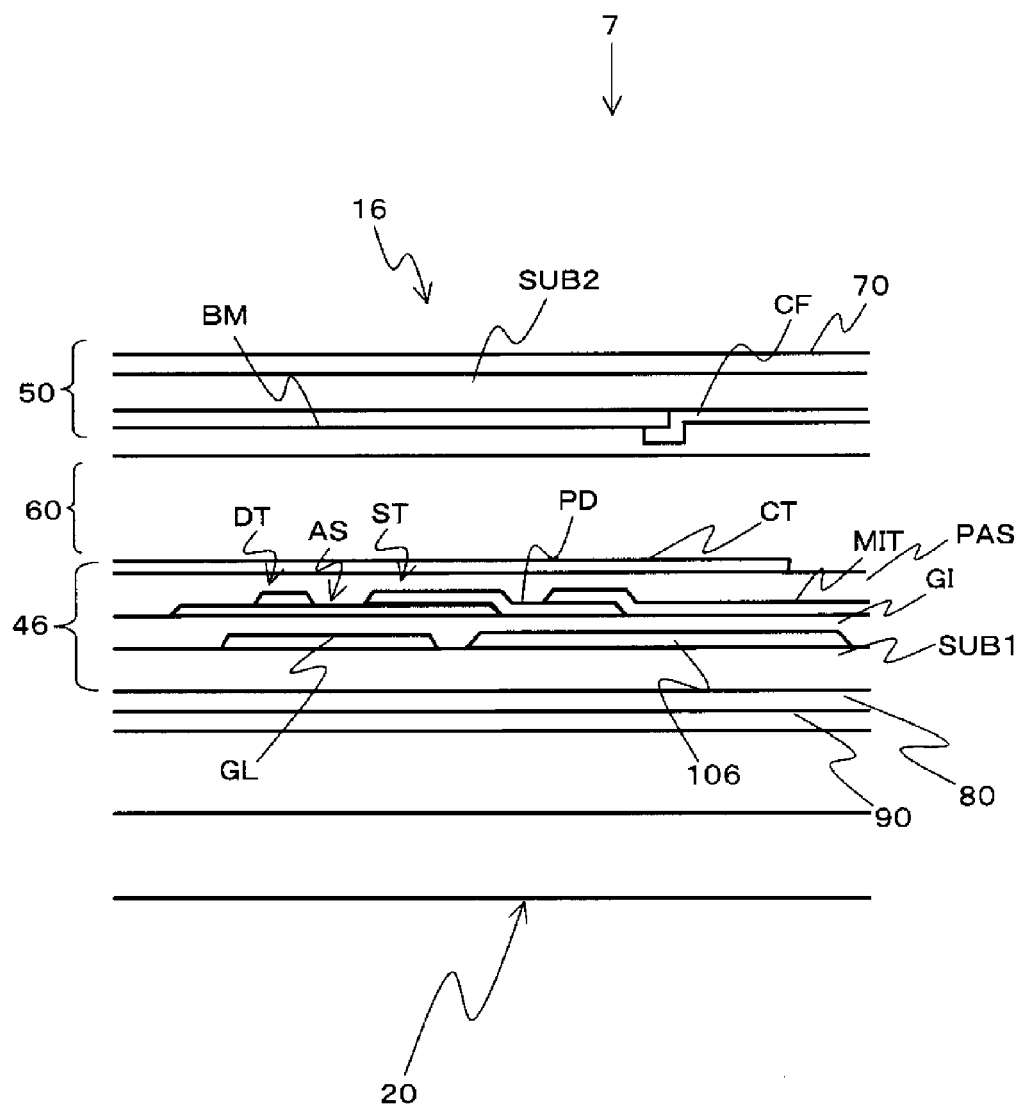
FIG. 15 is a sectional view of a liquid crystal display panel taken along the line XV-XV of the TFT substrate illustrated in FIG. 14.

Next, a seventh embodiment of the present invention is described with reference to FIGS. 14 and 15. FIG. 14 is a plan view of a TFT substrate 46 of a liquid crystal display device 7 according to the seventh embodiment of the present invention when viewed from a surface thereof having the pixel electrode MIT formed thereon. FIG. 15 is a sectional view of a liquid crystal display panel 16 taken along the line XV-XV of the TFT substrate 46 illustrated in FIG. 14.

The liquid crystal display panel 16 of the liquid crystal display device 7 of the seventh embodiment has a structure called a common top structure. Specifically, the liquid crystal display panel 16 has a structure in which the pixel electrode MIT and the source electrode ST are not connected to each other via the through hole TH but are directly connected to each other, and the common electrode CT is formed closer to the liquid crystal layer 60 than the pixel electrode MIT. Further, in the common top structure, the pixel electrode MIT is formed into a plane shape, and the common electrode CT is provided with slits.

In the TFT substrate 46 of the liquid crystal display device 7 of the seventh embodiment, reflection means 106 is provided. Note that, the same components as those in the above-mentioned embodiments are represented by the same reference symbols.

The reflection means 106 is a metal layer formed at a surface of the liquid crystal display panel on the backlight unit 20 side in a portion which overlaps, in plan view, the end portion of the slit SL of the common electrode in the long-side direction and the vicinity thereof, and a part of the inner region of the slit SL. The reflection means 106 is arranged separately from the another metal layer different from the metal layer forming the reflection means 106, for example, the scanning signal line GL formed in the same layer.

The liquid crystal display device 7 of the seventh embodiment also includes the reflection means 106 for reflecting light, the reflection means 106 being formed at a surface of the liquid crystal display panel on the illumination device (backlight unit) side in a region (domain) in which the transmittance becomes low because the liquid crystal molecules are aligned in a direction different from the desired direction. Therefore, illumination light entering the domain region, which has conventionally been a loss, is reflected toward the backlight unit, and hence the light can be effectively reused. That is, also in the common top structure as this embodiment, similarly to the liquid crystal display device 1 of the first embodiment, it is possible to achieve the liquid crystal display device having higher brightness or lower power consumption.

Eighth Embodiment

Figure 16:
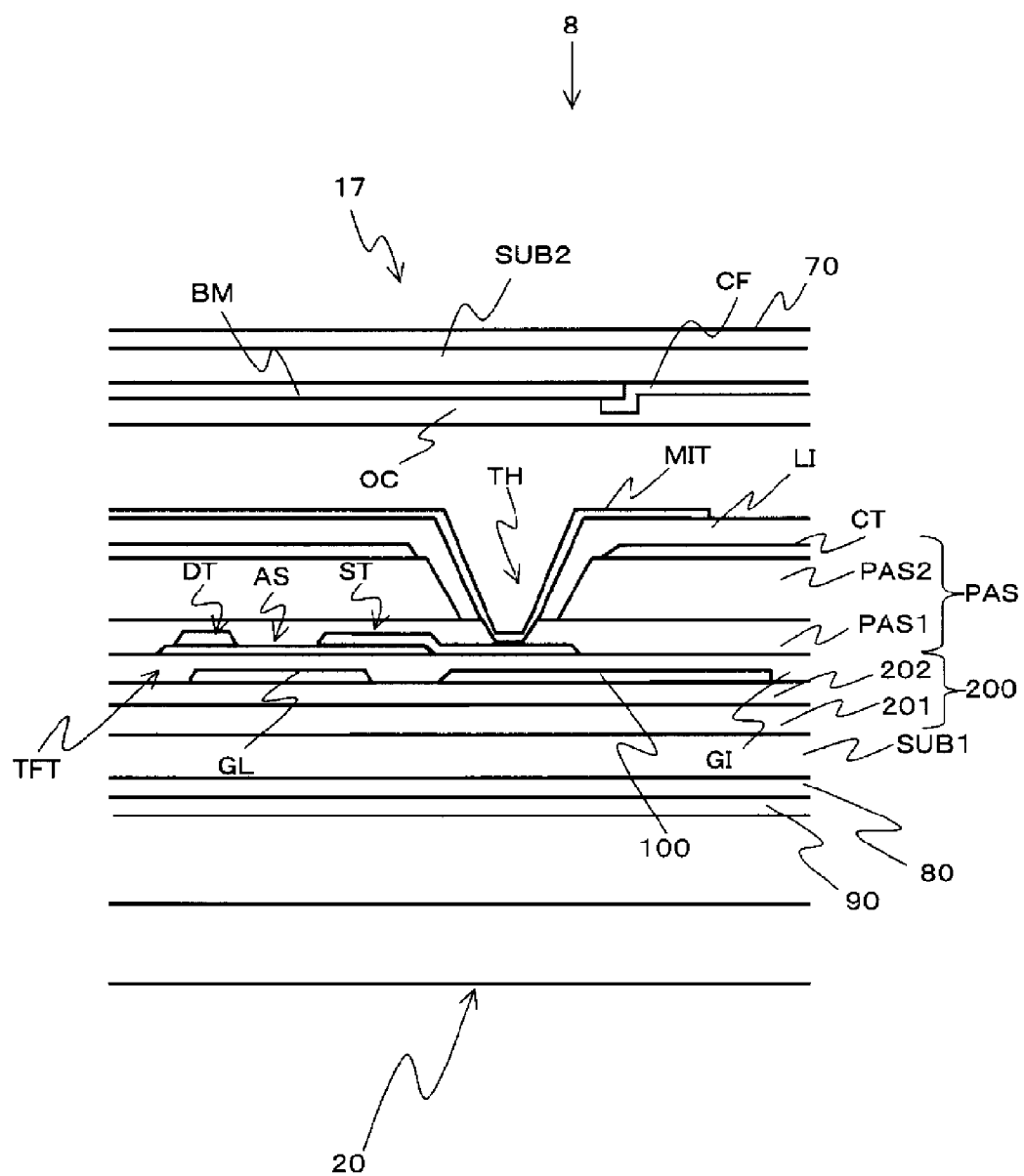
FIG. 16 is a sectional view of a main part of a liquid crystal display panel of a liquid crystal display device according to an eighth embodiment of the present invention.

Next, an eighth embodiment of the present invention is described with reference to FIG. 16. FIG. 16 is a sectional view of a main part of a liquid crystal display panel 17 of a liquid crystal display device 8 according to the eighth embodiment of the present invention.

The liquid crystal display device 8 of the eighth embodiment is formed by further adding an underlayer 200 to the liquid crystal display device 1 of the first embodiment. Note that, the same components as those in the above-mentioned embodiments are represented by the same reference symbols.

The underlayer 200 is formed between the insulating substrate SUB1 and the reflection means 100, that is, at the surface of the liquid crystal display panel 10 on the backlight unit 20 side. The underlayer 200 has a lamination structure in which layers having different refractive indexes are laminated.

Specifically, the underlayer 200 has a two-layer structure in which a high refractive index layer 201 and a low refractive index layer 202 are laminated in the stated order from the backlight unit 20 side toward the liquid crystal layer 60. The high refractive index layer 201 is a layer having a higher refractive index than that of the insulating substrate SUB1. Further, the low refractive index layer 202 is a layer having a lower refractive index than that of the high refractive index layer 201.

Here, when the reflection means 100 is made of an aluminum material and, for example, the high refractive index layer 201 is a silicon nitride ($SiN_x$) layer having a thickness of 100 nm and the low refractive index layer 202 is a silicon oxide ($SiO_x$) layer having a thickness of 50 nm, the reflectance of the reflection means 100 increases by about 5% when compared to a case where the underlayer 200 is absent.

Specifically, when the reflection means 100 is made of an aluminum material and the underlayer 200 is absent, the reflectance of the reflection means 100 is 88.5%. However, when the reflection means 100 is made of an aluminum material and the underlayer 200 is present, the reflectance of the reflection means 100 increases to 92.7%.

In the liquid crystal display device 8 of the eighth embodiment, a rear-surface reflectance of the liquid crystal display panel 17 increases by the underlayer 200. Therefore, a greater brightness increase effect can be obtained.

Further, when $SiN_x$ is used for the high refractive index layer 201, the underlayer 200 can also serve as means for suppressing ions from penetrating outside from the insulating substrate SUB1 when poly-silicon (LTPS) is used for the semiconductor layer of the thin film transistor TFT. In this manner, without increasing the manufacturing cost, a greater brightness increase effect can be obtained.

Note that, in the eighth embodiment, description is made of an example in which the underlayer 200 has the two-layer structure in which the high refractive index layer 201 and the low refractive index layer 202 are laminated in the stated order from the backlight unit 20 side toward the liquid crystal layer 60. However, the present invention is not limited thereto. That is, as long as the underlayer 200 has a lamination structure in which layers having different refractive indexes are laminated, other lamination structures may be employed.

Ninth Embodiment

Figure 17:
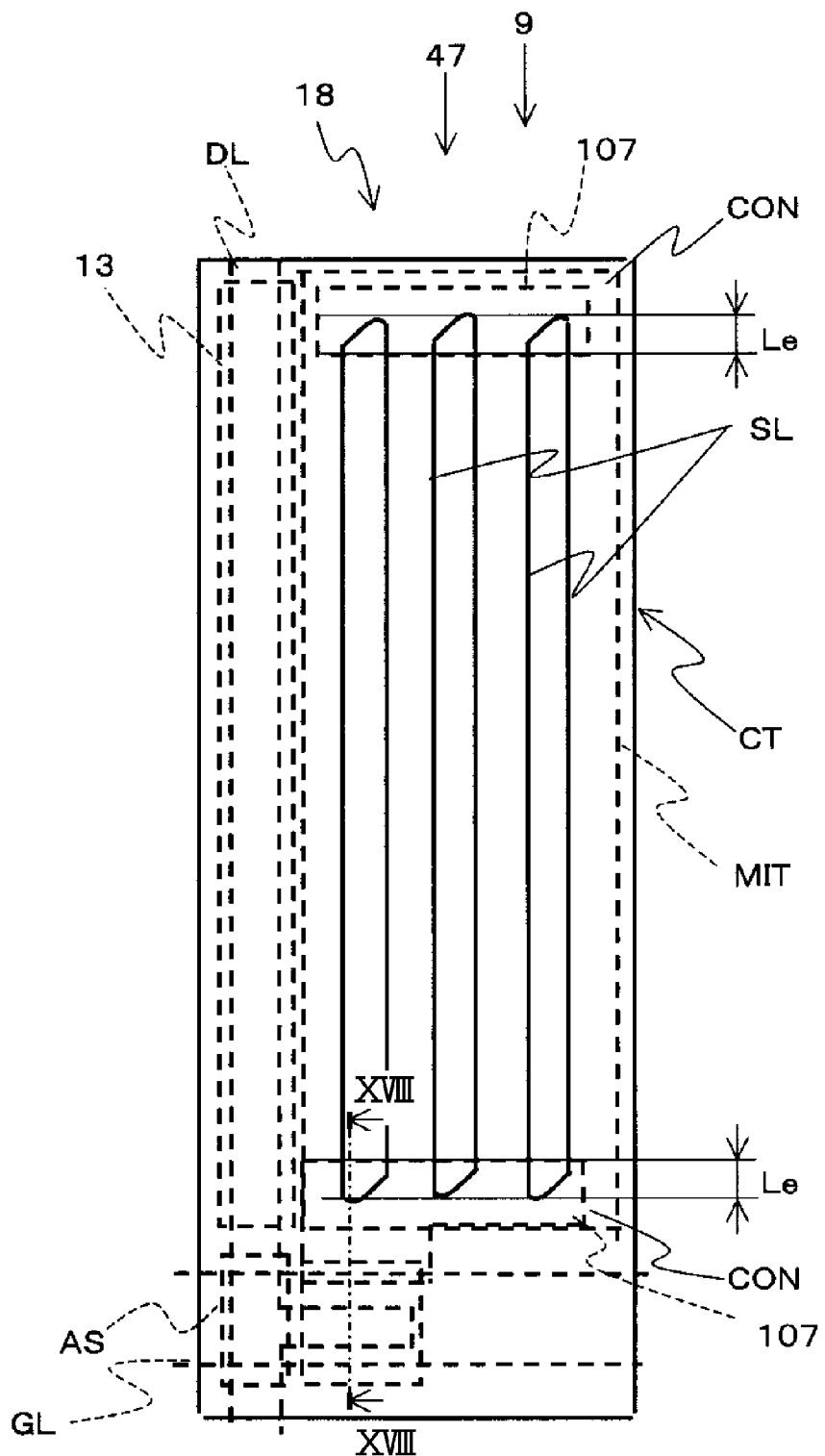
FIG. 17 is a plan view of a TFT substrate of a liquid crystal display panel of a liquid crystal display device according to a ninth embodiment of the present invention when viewed from a surface thereof having a pixel electrode formed thereon.
Figure 18:
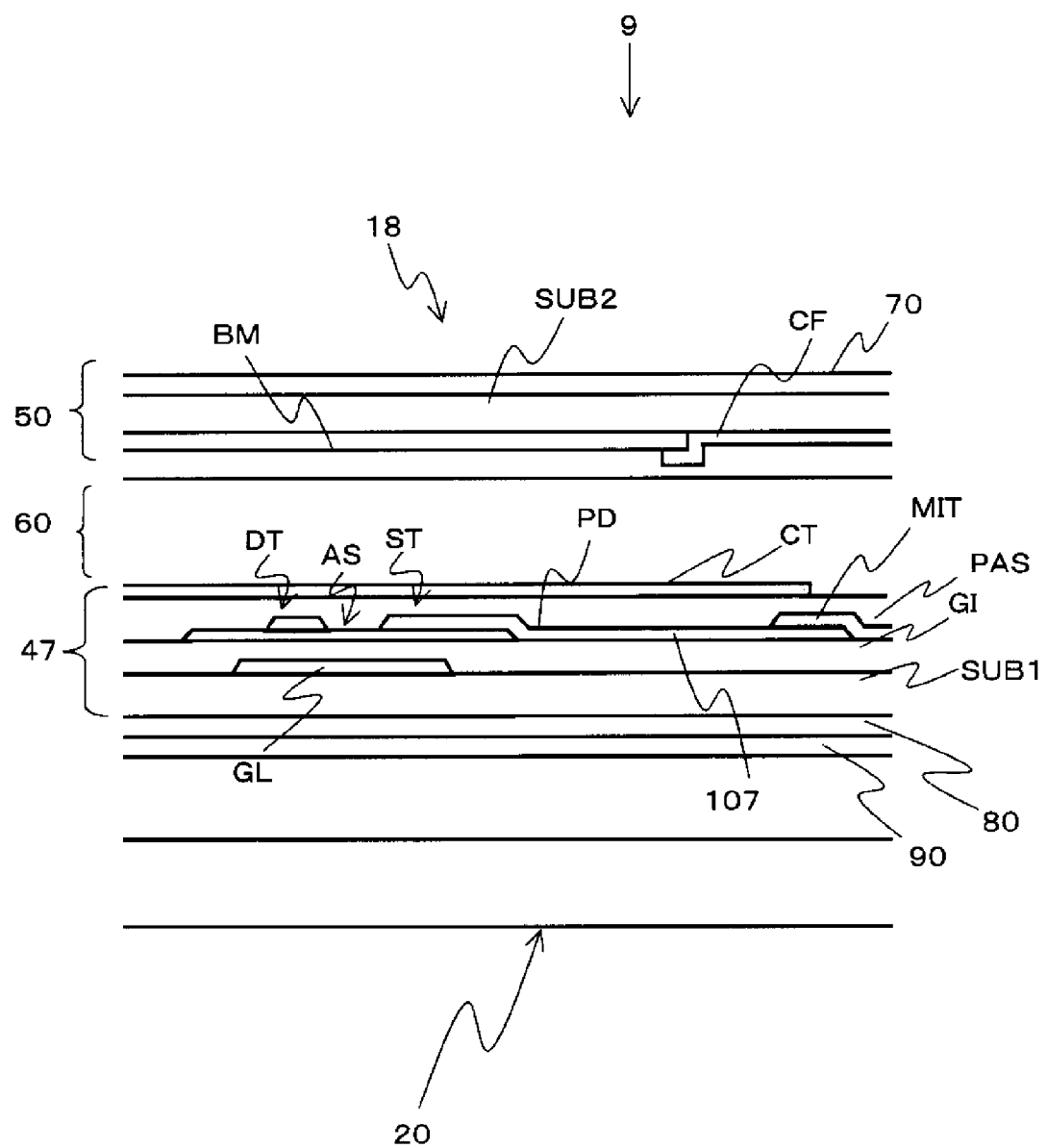
FIG. 18 is a sectional view of the liquid crystal display panel taken along the line XVIII-XVIII of the TFT substrate illustrated in FIG. 17.

Next, a ninth embodiment of the present invention is described with reference to FIGS. 17 and 18. FIG. 17 is a plan view of a TFT substrate 47 of a liquid crystal display panel 18 of a liquid crystal display device 9 according to the ninth embodiment of the present invention when viewed from a surface thereof having the pixel electrode MIT formed thereon. FIG. 18 is a sectional view of the liquid crystal display panel 18 taken along the line XVIII-XVIII of the TFT substrate 47 illustrated in FIG. 17.

The liquid crystal display panel 18 of the ninth embodiment has, similarly to the liquid crystal display panel 16 of the seventh embodiment, a structure called a common top structure.

In the TFT substrate 47 of the liquid crystal display device 9 of the ninth embodiment, reflection means 107 is provided. Note that, the same components as those in the above-mentioned embodiments are represented by the same reference symbols.

The reflection means 107 is formed with use of a metal layer in the same layer as the source electrode ST, and is formed so as to overlap, in plan view, the end portion of the slit SL of the common electrode in the long-side direction and the vicinity thereof, and a part of the inner portion of the slit SL. That is, the reflection means 107 is electrically connected to the pixel electrode MIT, and a part thereof (reflection means 107 on the TFT side) is integrally formed with the source electrode ST.

The liquid crystal display device 9 of the ninth embodiment also includes the reflection means 107 for reflecting light, the reflection means 107 being formed at a surface of the liquid crystal display panel on the illumination device (backlight unit) side in a region (domain) in which the transmittance becomes low because the liquid crystal molecules are aligned in a direction different from the desired direction. Therefore, illumination light entering the domain region, which has conventionally been a loss, is reflected toward the illumination device (backlight unit), and hence the light can be effectively reused. That is, also in the common top structure as this embodiment, similarly to the liquid crystal display device 1 of the first embodiment, it is possible to achieve the liquid crystal display device having higher brightness or lower power consumption. In addition, the reflection means 107 can be formed in the same step of forming the source electrode ST, and hence the reflection means 107 can be formed without increasing the manufacturing cost.

Further, in this embodiment, the potential of the reflection means becomes the same as that of the pixel electrode, and hence there is an advantage that no adverse effect is exerted on the driving of the liquid crystal.

Tenth Embodiment

Figure 19:
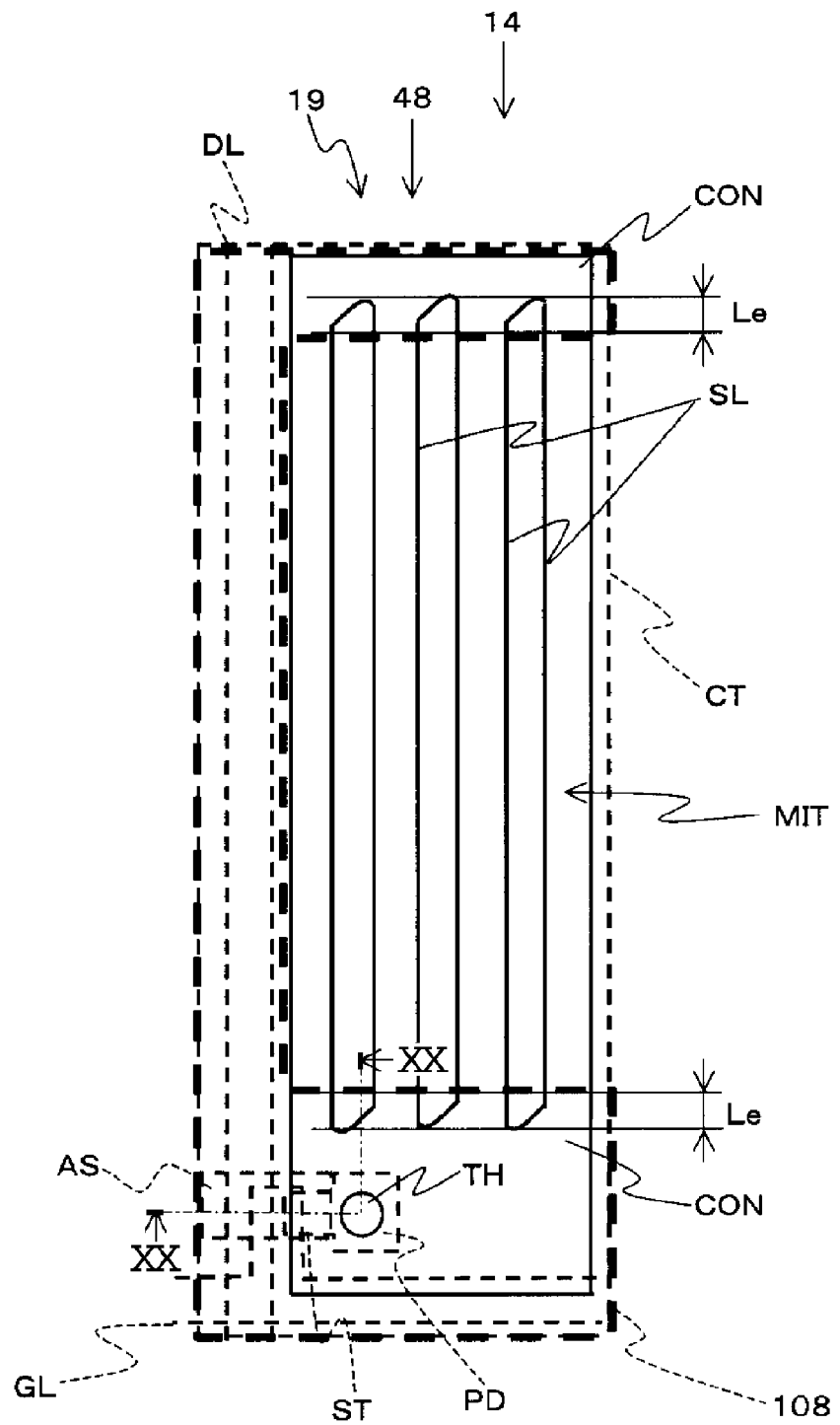
FIG. 19 is a plan view of a TFT substrate of a liquid crystal display device according to a tenth embodiment of the present invention when viewed from a surface thereof having a pixel electrode formed thereon.
Figure 20:
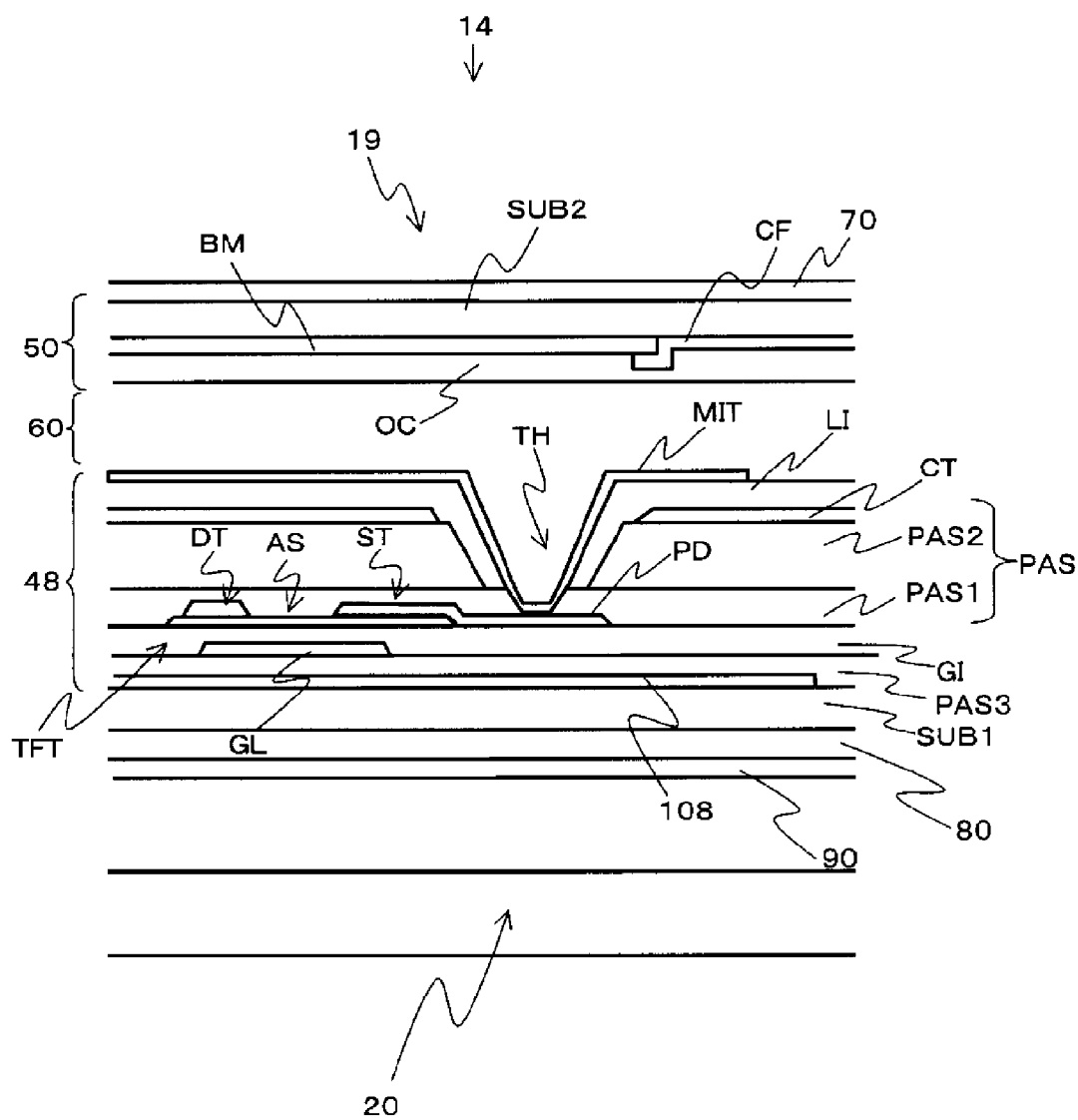
FIG. 20 is a sectional view of a liquid crystal display panel taken along the line XX-XX of the TFT substrate illustrated in FIG. 19.

Next, a tenth embodiment of the present invention is described with reference to FIGS. 19 and 20. FIG. 19 is a plan view of a TFT substrate 48 of a liquid crystal display device 14 according to the tenth embodiment of the present invention when viewed from a surface thereof having the pixel electrode MIT formed thereon. FIG. 20 is a sectional view of a liquid crystal display panel 19 taken along the line XX-XX of the TFT substrate 48 illustrated in FIG. 19.

In the TFT substrate 48 of the liquid crystal display device 14 of the tenth embodiment, reflection means 108 is formed in a layer different from the metal layer including the scanning signal line GL and the video signal line DL. That is, the TFT substrate 48 further includes a layer forming the reflection means 108 alone. Note that, the same components as those in the above-mentioned embodiments are represented by the same reference symbols.

Specifically, as illustrated in FIG. 20, the reflection means 108 is a layer formed at a surface of the liquid crystal display panel on the backlight unit 20 side so as to overlap, in plan view, the end portion of the slit SL in the long-side direction and the vicinity thereof, and a part of the inner region of the slit SL. Further, the reflection means 108 is formed in a layer different from the another metal layer different from the metal layer forming the reflection means 108. In the tenth embodiment, the reflection means 108 is formed in a layer at a position closest to the illumination device (backlight unit) via an insulating film PAS3.

Further, the reflection means 108 is also formed at a position which overlaps, in plan view, a position corresponding to a non-opening portion in which the light shielding film BM and the spacer (not shown) are arranged.

In the liquid crystal display device 14 of the tenth embodiment, when a metal layer is used for the reflection means 108, the reflection means 108 is electrically separated from the another metal layer, and hence no adverse effect is exerted on the driving of the liquid crystal and the like. Further, similarly to the above-mentioned embodiments, the liquid crystal display device 14 includes the reflection means for reflecting light, the reflection means being formed at a surface of the liquid crystal display panel on the illumination device (backlight unit) side in a region (domain) in which a transmittance becomes low because the liquid crystal molecules are aligned in a direction different from the desired direction. Therefore, illumination light entering the domain region, which has conventionally been a loss, is reflected toward the illumination device (backlight unit), and hence the light can be effectively reused. Thus, similarly to the liquid crystal display device 1 of the first embodiment, it is possible to achieve the liquid crystal display device having higher brightness or lower power consumption. In addition, the liquid crystal display device 14 includes an independent layer as the reflection means 108, and hence the freedom of the formation region of the reflection means 108 increases. Thus, the reflection means can be more efficiently arranged in the low transmittance region. Therefore, a greater brightness increase effect can be obtained.

Note that, in the liquid crystal display devices 1 to 10 of the respective first to tenth embodiments of the present invention, description is made of an example in a case where the electrode MIT or CT has the slit SL in which both end portions in the long-side direction are closed, but the present invention is not limited thereto. That is, there may be used a comb-shaped electrode MIT or CT in which one end of both the end portions of the slit SL is closed and the other end thereof is opened. Further, the liquid crystal display device may be a lateral electric field type liquid crystal display device in which the common electrode and the pixel electrode are formed in the same layer.

Further, as described as an example above, the liquid crystal display devices 1 to 10 of the respective first to tenth embodiments of the present invention are each preferred to include the reflection-type polarizing plate 90. The reason is as follows. When light reflected by the reflection means returns to the illumination device (backlight unit), and then travels toward the liquid crystal display panel again, a polarization state of the light is changed. Therefore, when the reflection-type polarizing plate 90 is absent, part of light traveling toward the liquid crystal display panel again is absorbed by the rear-surface polarizing plate 80, which causes a loss. In contrast, when the reflection-type polarizing plate 90 is provided, even when the polarization state of the light changes, the light traveling from the illumination device (backlight unit) toward the liquid crystal display panel again is reflected by the reflection-type polarizing plate 90 before being absorbed in the rear-surface polarizing plate 80, and thus the light is reused. However, the present invention is not limited thereto, and the reflection-type polarizing plate 90 may be omitted.

Further, in the liquid crystal display devices 1 to 10 of the respective first to tenth embodiments of the present invention, description is made of an example in which the reflection means 13 is formed at the surface of the liquid crystal display panel on the backlight unit 20 side in a portion which overlaps, in plan view, the video signal line DL. However, it is only required in the present invention to form the reflection means at a position which overlaps, in plan view, the end portion of the slit SL of the electrode in the long-side direction and the vicinity thereof, and a part of the inner region of the slit SL. Therefore, the reflection means 13 may be omitted as necessary at the portion which overlaps the video signal line DL.

Further, in the liquid crystal display devices 1 to 10 of the respective first to tenth embodiments of the present invention, description is made of examples in which the reflection means 100 to 108 have a rectangular shape, a shape including the rectangular protruding portions 101b, or a shape including the wedge protruding portions 102b, but the present invention is not limited thereto. Other shapes may be employed as long as the shape effectively overlaps the low transmittance region.

Further, in the liquid crystal display devices 1 to 10 of the respective first to tenth embodiments of the present invention, description is made of an example in which the reflection means 100 to 108 are formed of a metal layer, but the present invention is not limited thereto. The reflection means 100 to 108 may be formed of a layer made of other materials as long as the material can reflect light. For example, the reflection means 100 to 108 may be formed of a dielectric multilayer film.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
    a liquid crystal display panel comprising:
        a TFT substrate including a thin film transistor;
        a counter substrate arranged opposed to the TFT substrate; and
        a liquid crystal layer sandwiched between the TFT substrate and the counter substrate,
            the TFT substrate including a pixel electrode and a common electrode laminated one on top of another via an insulating layer,
            one of the pixel electrode and the common electrode provided farther from the liquid crystal layer being formed into a plane shape, and another of the pixel electrode and the common electrode provided closer to the liquid crystal layer having a plurality of slits formed therein,
            each of the plurality of slits having an end portion in a long-side direction, which is closed; and
    illumination means serving as a light source for the liquid crystal display panel,
    wherein the liquid crystal display panel further comprises reflection means for reflecting light, the reflection means being formed at a surface of the liquid crystal display panel on the illumination means side in a portion which overlaps, in plan view, the end portion of the each of the plurality of slits in the long-side direction and a vicinity thereof, and a part of an inner region of the each of the plurality of slits.

2. The liquid crystal display device according to claim 1, wherein:
    the reflection means comprises a metal layer; and
    the reflection means is formed separately from another metal layer different from the metal layer forming the reflection means.

3. The liquid crystal display device according to claim 2, wherein the reflection means is formed in a layer different from the another metal layer.

4. The liquid crystal display device according to claim 1, wherein the reflection means is formed so that a distance from the end portion of the each of the plurality of slits in the long-side direction is within a range of larger than 0 µm and 4 µm or smaller.

5. The liquid crystal display device according to claim 1, wherein the reflection means is formed so that a distance from the end portion of the each of the plurality of slits in the long-side direction is within a range of 2 µm or larger and 4 µm or smaller.

6. The liquid crystal display device according to claim 1, wherein:
    the end portion of the each of the plurality of slits in the long-side direction has a shape in which one side of a pair of sides forming a width of the each of the plurality of slits in a short-side direction is inclined toward another side of the pair of sides so that the end portion is tapered; and
    the reflection means is formed from the another side different from the inclined side of the pair of sides up to substantially a center position of the width of the each of the plurality of slits in the short-side direction.

7. The liquid crystal display device according to claim 6, wherein:
    the reflection means comprises:
        a base portion formed into a plane shape; and
        a plurality of protruding portions formed so as to protrude from the base portion; and
    each of the plurality of protruding portions is formed so as to overlap the end portion of the each of the plurality of slits from the another side different from the inclined side of the pair of sides forming the end portion of the each of the plurality of slits up to substantially the center position of the width of the each of the plurality of slits in the short-side direction.

8. The liquid crystal display device according to claim 1, wherein:
    the each of the plurality of slits is bent in a vicinity of the end portion in the long-side direction and has a tapered shape;
    the reflection means comprises:
        a base portion formed into a plane shape; and
        a plurality of protruding portions formed so as to protrude from the base portion; and
    each of the plurality of protruding portions is formed into a wedge shape in which a top end thereof is positioned at substantially a center of a width of the each of the plurality of slits in a short-side direction.

9. The liquid crystal display device according to claim 1, wherein:
    the each of the plurality of slits is bent; and
    the reflection means is formed so as to overlap a bent portion of the each of the plurality of slits.

10. The liquid crystal display device according to claim 1, wherein the liquid crystal display panel further comprises:
    a front-surface polarizing plate arranged on a display surface side of the liquid crystal display panel;
    a rear-surface polarizing plate arranged on a surface of the liquid crystal display panel on the illumination means side; and
    a reflection-type polarizing plate arranged on a surface of the rear-surface polarizing plate on the illumination means side, the reflection-type polarizing plate being configured to transmit linearly polarized light in a transmission axis direction of the rear-surface polarizing plate and reflect linearly polarized light in an absorption axis direction of the rear-surface polarizing plate.

11. The liquid crystal display device according to claim 1, wherein the liquid crystal display panel further comprises an underlayer having a lamination structure in which layers having different refractive indexes are laminated, the underlayer being formed between a transparent insulating substrate forming the liquid crystal display panel and the reflection means.

12. The liquid crystal display device according to claim 1, wherein the reflection means is formed in the same layer as a layer in which a scanning signal line of the liquid crystal display panel is formed.

13. The liquid crystal display device according to claim 1, wherein the reflection means is formed in the same layer as a layer in which a source electrode of the liquid crystal display panel is formed, and is electrically connected to the pixel electrode.

14. The liquid crystal display device according to claim 1, wherein the reflection means is further formed at a portion overlapping a video signal line of the liquid crystal display panel.

* * * * *